(12) United States Patent
Tsuji et al.

(10) Patent No.: US 8,786,699 B2
(45) Date of Patent: Jul. 22, 2014

(54) SUSPICIOUS PERSON DETECTION DEVICE, SUSPICIOUS PERSON DETECTION METHOD AND SUSPICIOUS PERSON DETECTION PROGRAM

(75) Inventors: Kentaro Tsuji, Kawasaki (JP); Eigo Segawa, Kawasaki (JP); Takashi Morihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 240 days.

(21) Appl. No.: 13/315,770

(22) Filed: Dec. 9, 2011

(65) Prior Publication Data

US 2012/0127304 A1     May 24, 2012

Related U.S. Application Data

(63) Continuation of application No. PCT/JP2009/060693, filed on Jun. 11, 2009.

(51) Int. Cl.
*H04N 7/18* (2006.01)
(52) U.S. Cl.
USPC ........................................................ 348/135
(58) Field of Classification Search
USPC .................................. 340/561–580; 348/135
See application file for complete search history.

(56) References Cited

U.S. PATENT DOCUMENTS

| | | | |
|---|---|---|---|
| 5,892,454 A * | 4/1999 | Schipper et al. ............. | 340/573.4 |
| 6,801,640 B1 | 10/2004 | Okubo et al. | |
| 7,233,243 B2 * | 6/2007 | Roche et al. .................. | 340/540 |
| 7,365,643 B1 | 4/2008 | Cole | |
| 2004/0263315 A1 * | 12/2004 | Kim et al. ...................... | 340/5.7 |
| 2005/0054290 A1 * | 3/2005 | Logan et al. .................. | 455/41.2 |
| 2006/0080541 A1 * | 4/2006 | Monaco et al. ............... | 713/182 |
| 2006/0164237 A1 * | 7/2006 | Medve et al. ............ | 340/539.13 |
| 2007/0083915 A1 * | 4/2007 | Janakiraman et al. ............ | 726/4 |
| 2008/0007407 A1 * | 1/2008 | de Elia ........................ | 340/572.1 |
| 2009/0213123 A1 * | 8/2009 | Crow ............................. | 345/473 |
| 2011/0115634 A1 * | 5/2011 | Monden ...................... | 340/573.1 |

FOREIGN PATENT DOCUMENTS

JP     4-15900     1/1992

(Continued)

OTHER PUBLICATIONS

International Search Report, mailed Sep. 29, 2009, in corresponding International Application No. PCT/JP2009/060693 (3 pp.).
Extended European Search Report issued Nov. 23, 2012 in corresponding European Patent Application No. 09845815.1.
Hayasaka, M. et al., *Multiple Object Tracking Using Back Projection Method and Kalman Filter*, Technical Report of IEICE, vol. 101, No. 421, 2001, pp. 133-138.

(Continued)

*Primary Examiner* — Christopher S Kelley
*Assistant Examiner* — Asmamaw G Tarko
(74) *Attorney, Agent, or Firm* — Staas & Halsey LLP

(57) ABSTRACT

A suspicious person detection device is provided with a person detection section capable of detecting the position of persons for each of the persons, a person tracing section for continuously tracing the position of a person detected by the person detection section, and a suspicious person detection section for detecting a suspicious person according to the result of the trace of the person tracing section, wherein the person tracing section determines a person authenticated as a result of the agreement with a predetermined first condition as an authenticated person and determines a person who has agreed with a predetermined second condition associated with the authenticated person as an accompanying person at the time of the authentication, and wherein the suspicious person detection section issues a warning when the accompanying person is away from the authenticated person by a predetermined first distance or more.

11 Claims, 28 Drawing Sheets

(56) References Cited

FOREIGN PATENT DOCUMENTS

| | | |
|---|---|---|
| JP | 2004-240839 | 8/2004 |
| JP | 2006-146378 | 6/2006 |
| JP | 2007-141146 | 6/2007 |
| JP | 2007-286872 | 11/2007 |
| JP | 2008-59179 | 3/2008 |
| JP | 2008-117264 | 5/2008 |
| JP | 2008-123186 | 5/2008 |
| JP | 2008-134729 | 6/2008 |
| JP | 2008-152328 | 7/2008 |
| JP | 2008-197946 | 8/2008 |
| WO | 2009/025140 | 2/2009 |

OTHER PUBLICATIONS

International Preliminary Report on Patentability mailed Jan. 26, 2012 issued in corresponding International Patent Application No. PCT/JP2009/060693.

Hayasaka, M. et al., *Multiple Object Tracking Using Projection Method and Kalman Filter*, Technical Report of IEICE, vol. 101, No. 421, 2001, pp. 133-138.

Nakamura, K. et al., Tracking Pedestrians Using Multiple Single-Row Laser Range Scanners and Its Reliability Evaluation, The Transactions of the IEICE, D-II, vol. J88-D2, No. 7, pp. 1143-1152, 2005.

* cited by examiner

FIG. 4

| AUTHENTICATION INFORMATION DATABASE ||| |
|---|---|---|---|
| USER ID | NAME | REGISTERED AUTHENTICATION INFORMATION (PASSWORD) | |
| 000001 | TARO YAMADA | ○○○○○○ | |
| 000002 | JIRO SUZUKI | △△△△△△ | |
| 000003 | SABURO SATO | □□□□□□ | |
| .. | | | 122 |

FIG. 5

PERSON INFORMATION DATABASE

| TRACKING DATA ID | USER ID | AUTHENTICATION STATUS | ASSOCIATED ALREADY-AUTHENTICATED USER ID | PERSON'S POSITION (x, y) | MOVING TRAJECTORY (x, y) | | |
|---|---|---|---|---|---|---|---|
| | | | | | POSITION BEFORE ONE PERIOD | POSITION BEFORE TWO PERIODS | ... | POSITION BEFORE N PERIODS |
| 001 | 000001 | ALREADY-AUTHENTICATED | NO ID | (100, 200) | (110, 210) | (120, 200) | (50, 0) |
| 002 | NO ID | NOT-YET-AUTHENTICATED | 000001 | (500, 100) | (500, 100) | (450, 150) | (0, 200) |
| 003 | 000003 | ALREADY-AUTHENTICATED | NO ID | (0, 0) | (20, 20) | (20, 20) | (20, 20) |
| ... | | | | | | | |

| | INFORMATION IN PERSON INFORMATION DATABASE | | | | | |
|---|---|---|---|---|---|---|
| | USER 1A | | | USER 1B | | |
| CONTENTS OF BEHAVIOR | USER ID | AUTHENTICATION STATUS | ASSOCIATED ALREADY-AUTHENTICATED USER ID | USER ID | AUTHENTICATION STATUS | ASSOCIATED ALREADY-AUTHENTICATED USER ID |
| (1) BEFORE AUTHENTICATION | NO ID | NOT-YET-AUTHENTICATED | NO ID | NO ID | NOT-YET-AUTHENTICATED | NO ID |
| (2) AFTER AUTHENTICATION OF USER 1A | USER 1A | ALREADY-AUTHENTICATED | NO ID | NO ID | NOT-YET-AUTHENTICATED | USER 1A |
| (3) USERS 1A, 1B ENTERING ROOM 20 | USER 1A | ALREADY-AUTHENTICATED | NO ID | NO ID | NOT-YET-AUTHENTICATED | USER 1A |

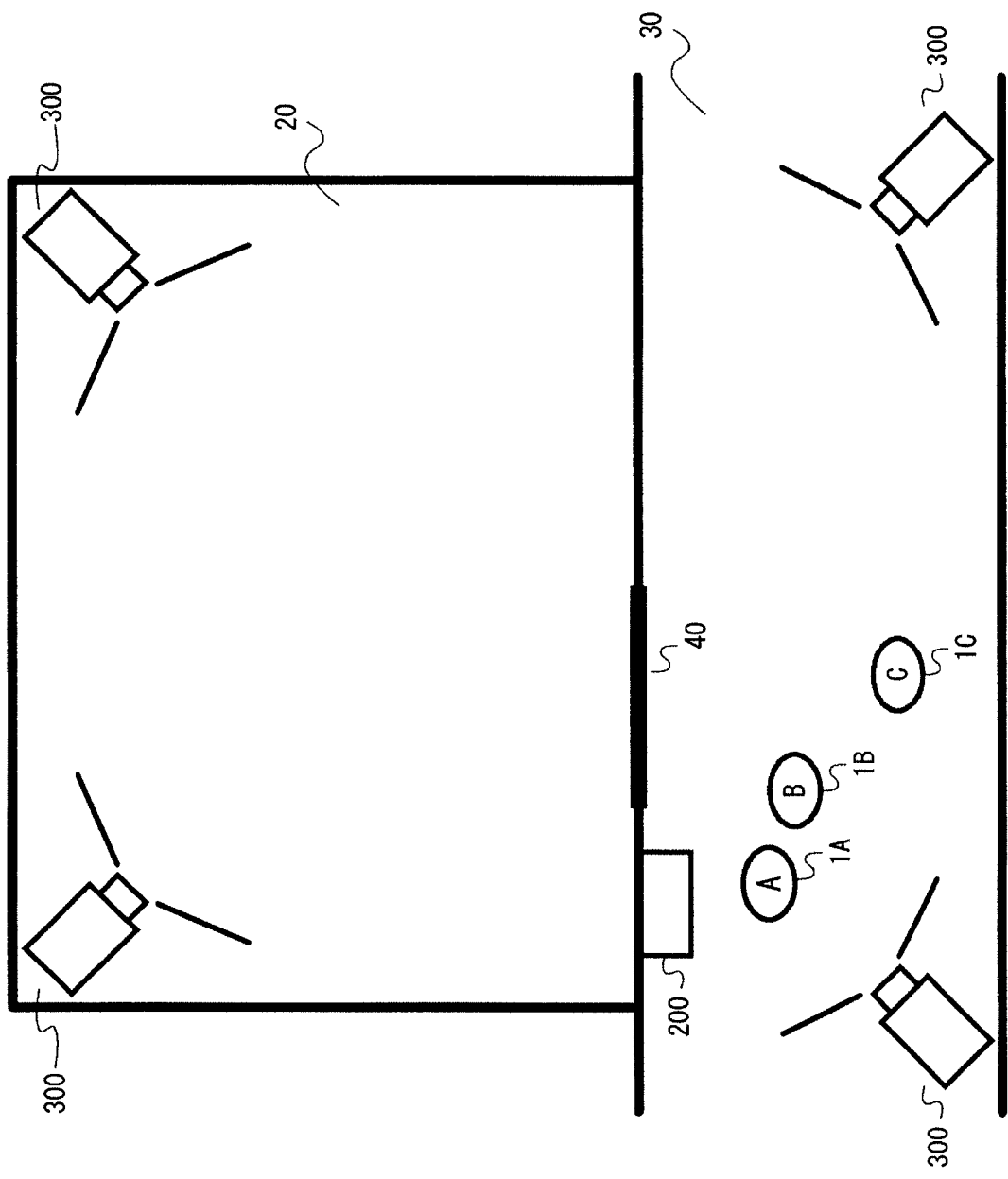

FIG. 14

| CONTENTS OF BEHAVIOR | INFORMATION IN PERSON INFORMATION DATABASE ||||
| --- | --- | --- | --- | --- |
| | USER 1A || USER 1B ||
| | USER ID | AUTHENTICATION STATUS | ASSOCIATED ALREADY-AUTHENTICATED USER ID | USER ID | AUTHENTICATION STATUS | ASSOCIATED ALREADY-AUTHENTICATED USER ID |
| (1) BEFORE AUTHENTICATION | NO ID | NOT-YET-AUTHENTICATED | NO ID | NO ID | NOT-YET-AUTHENTICATED | NO ID |
| (2) AFTER AUTHENTICATION OF USER 1A | USER 1A | ALREADY-AUTHENTICATED | NO ID | NO ID | NOT-YET-AUTHENTICATED | USER 1A |
| (3) USERS 1A, 1B ENTERING ROOM 20 | USER 1A | ALREADY-AUTHENTICATED | NO ID | NO ID | NOT-YET-AUTHENTICATED | USER 1A |
| (4) AFTER AUTHENTICATION OF USER 1C | USER 1A | ALREADY-AUTHENTICATED | NO ID | NO ID | NOT-YET-AUTHENTICATED | USER 1A |

| CONTENTS OF BEHAVIOR | USER 1C |||
| --- | --- | --- | --- |
| | USER ID | AUTHENTICATION STATUS | ASSOCIATED ALREADY-AUTHENTICATED USER ID |
| (1) BEFORE AUTHENTICATION | NO ID | NOT-YET-AUTHENTICATED | NO ID |
| (2) AFTER AUTHENTICATION OF USER 1A | NO ID | NOT-YET-AUTHENTICATED | USER 1A |
| (3) USERS 1A, 1B ENTERING ROOM 20 | NO ID | NOT-YET-AUTHENTICATED | NO ID |
| (4) AFTER AUTHENTICATION OF USER 1C | USER 1C | ALREADY-AUTHENTICATED | NO ID |

FIG. 20

ACCOMPANYING-ENABLED DISTANCE CONVERSION TABLE

| | | DIFFERENCE D IN MOVING VELOCITY | | | |
|---|---|---|---|---|---|
| | LESS THAN 0.5km/h | EQUAL TO OR LARGER THAN 0.5km/h BUT LESS THAN 1km/h | EQUAL TO OR LARGER THAN 1km/h BUT LESS THAN 2km/h | EQUAL TO OR LARGER THAN 2km/h BUT LESS THAN 3km/h | EQUAL TO OR LARGER THAN 3km/h |
| ANGULAR DIFFERENCE θ IN MOVING DIRECTION — LESS THAN 15 DEGREES | 10m | 9m | 8m | 7m | 6m |
| EQUAL TO OR LARGER THAN 15 DEGREES BUT LESS THAN 30 DEGREES | 9m | 7m | 5m | 5m | 4m |
| EQUAL TO OR LARGER THAN 30 DEGREES BUT LESS THAN 60 DEGREES | 7m | 6m | 5m | 3m | 3m |
| EQUAL TO OR LARGER THAN 60 DEGREES BUT LESS THAN 90 DEGREES | 5m | 4m | 3m | 2m | 2m |
| EQUAL TO OR LARGER THAN 90 DEGREES | 4m | 2m | 1m | 1m | 1m |

130

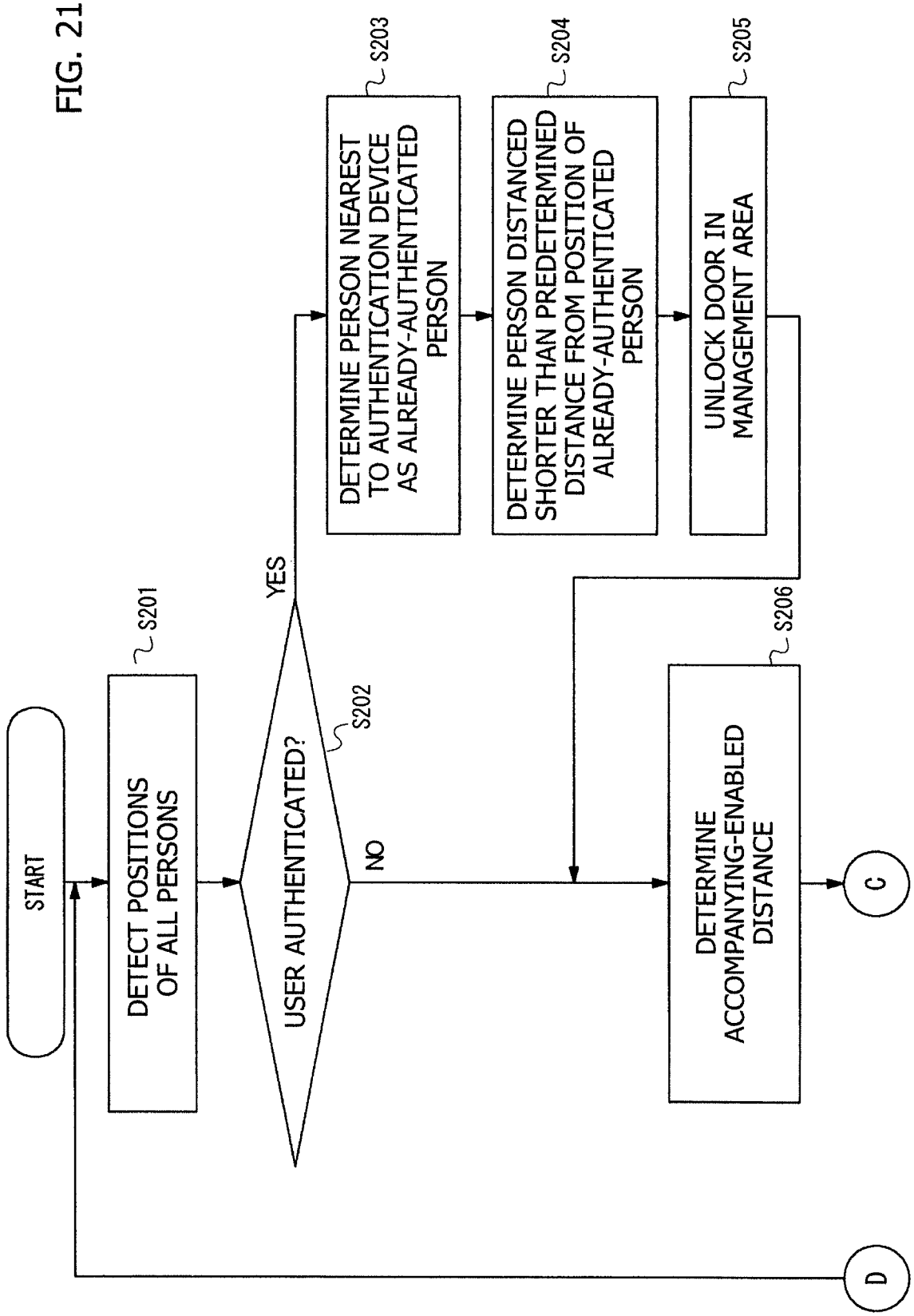

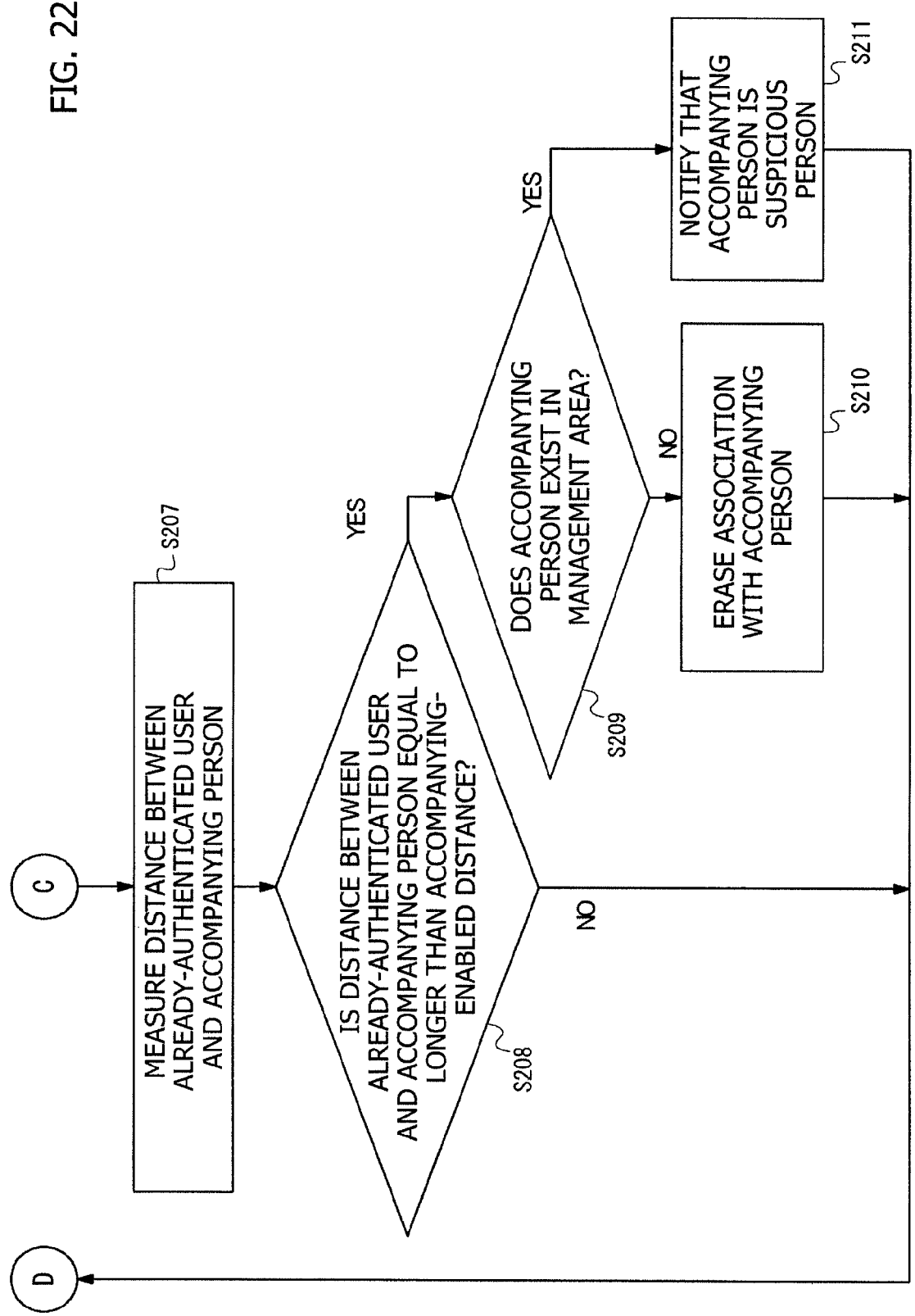

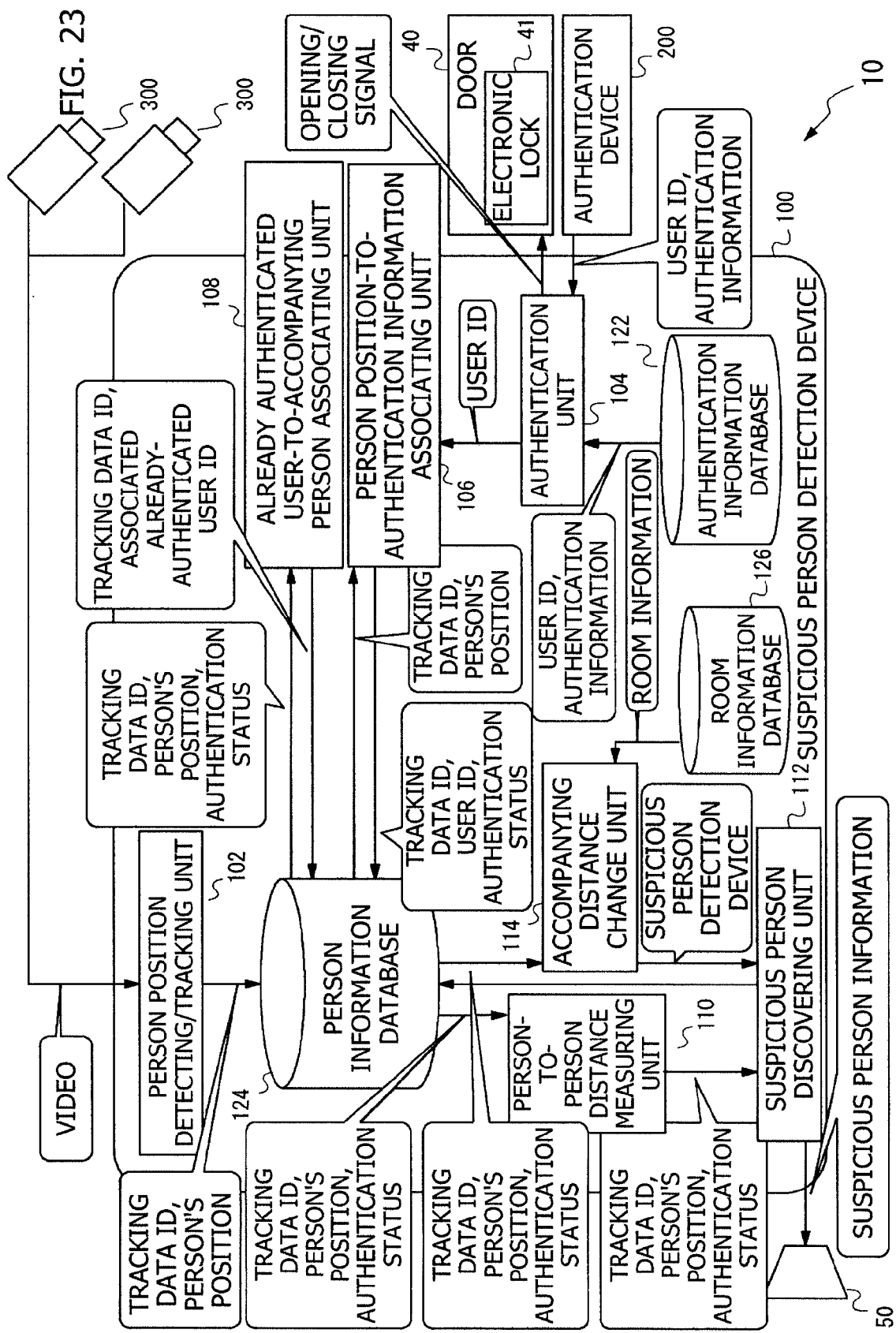

FIG. 24

ROOM INFORMATION DATABASE

| NAME OF ROOM | POSITION | DIMENSIONS | DEGREE OF SECRECY | ACCOMPANYING-ENABLED DISTANCE |
|---|---|---|---|---|
| MEETING ROOM | (x1, y1) | H1 x W1 | MIDDLE | 5m |
| EXECUTIVE ROOM A | (x2, y2) | H2 x W2 | HIGH | 3m |
| EXECUTIVE ROOM B | (x3, y3) | H3 x W3 | HIGH | 3m |
| PASSAGE | (x3, y3) | H4 x W4 | LOW | 10m |
| . . | | | | |

PERSON INFORMATION DATABASE

| TRACKING DATA ID | AUTHENTICATION STATUS | ASSOCIATED ALREADY-AUTHENTICATED USER ID | PERSON'S POSITION (x, y) | MOVING TRAJECTORY (x, y) | | | |
|---|---|---|---|---|---|---|---|
| | | | | POSITION BEFORE ONE PERIOD | POSITION BEFORE TWO PERIODS | ... | POSITION BEFORE N PERIODS |
| 001 | ALREADY-AUTHENTICATED | NO ID | (100, 200) | (110, 210) | (120, 200) | | (50, 0) |
| 002 | NOT-YET-AUTHENTICATED | 001 | (500, 100) | (500, 100) | (450, 150) | | (0, 200) |
| 003 | ALREADY-AUTHENTICATED | NO ID | (0, 0) | (20, 20) | (20, 20) | | (20, 20) |
| ... | | | | | | | |

125

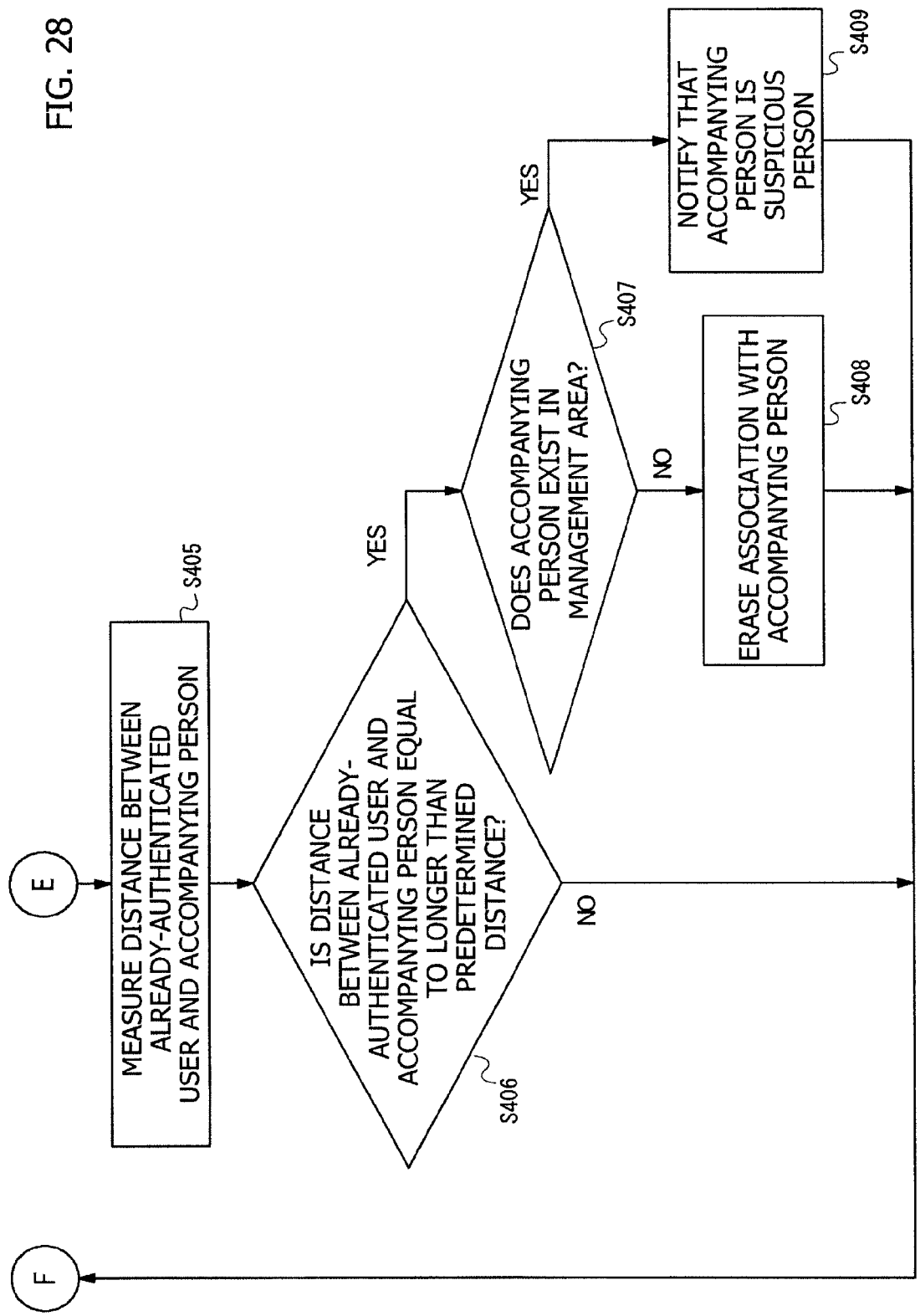

SUSPICIOUS PERSON DETECTION DEVICE, SUSPICIOUS PERSON DETECTION METHOD AND SUSPICIOUS PERSON DETECTION PROGRAM

CROSS-REFERENCE TO RELATED APPLICATION

This is a continuation of application, filed under 35 U.S.C. §111(a) of International Application PCT/JP2009/060693, filed on Jun. 11, 2009, the contents of which are herein wholly incorporated by reference.

FIELD

The present invention relates to a suspicious person detection device which detects a suspicious person, a suspicious person detection method and a suspicious person detection program.

BACKGROUND

Over the recent years, there have been an increased number of entry-and-exit systems (entry-and-exit management systems) contrived to permit only a limited number of persons (privileged persons) to enter a predetermined room (security room) by unlocking a door through an authenticating operation. This entry-and-exit system has, however, such a tailgating problem that when a regular user is authenticated and opens the door, a suspicious person is enabled to enter the security room in a way that follows the authenticated regular user. On the other hand, as a solution of this tailgating problem, there is an entry-and-exit system which grasps an authentication status of a person existing in front of the door and detects, when an unauthenticated person passes through the door, this person as an invalid passer.

DOCUMENTS OF PRIOR ARTS

Patent Document

[Patent document 1] Japanese Patent Application Laid-Open Publication No. 2008-117264
[Patent document 2] Japanese Patent Application Laid-Open Publication No. 2008-197946
[Patent document 3] Japanese Patent Application Laid-Open Publication No. 2007-286872
[Patent document 4] Japanese Patent Application Laid-Open Publication No. 2008-152328
[Patent document 5] Japanese Patent Application Laid-Open Publication No. 2008-134729
[Patent document 6] Japanese Patent Application Laid-Open Publication No. 2004-240839

Non-Patent Document

[Non-Patent document 1] "Multiple Object Tracking Using Back Projection Method and Kalman Filter", reported by Mitsuharu Hayasaka, Hideyoshi Tominaga and Kazumi Komiya, Technical Report of IEICE, Vol. 101, No. 421, pp. 133-138, PRMU2001-132, issued in November, 2001 by The Institute of Electronics, Information and Communication Engineers (IEICE)
[Non-Patent document 2] "Tracking Pedestrians Using Multiple Single-Row Laser Range Scanners and Its Reliability Evaluation", presented by Katsuyuki Nakamura, Zhao Huijing, Ryosuke Sibasaki, Kiyoshi Sakamoto, Tomowo Ooga and Naoki Suzukawa, Transactions D-II of IEICE, Vol. J88-D2, No. 7, pp. 1143-1152, issued in July, 2005 by The Institute of Electronics, Information and Communication Engineers (IEICE)

SUMMARY

The entry-and-exit system, which grasps the authentication status of the person existing in front of the door and detects, when the unauthenticated person passes through the door, this person as the invalid passer, has an extremely high level of security but prevents, even when the regular user accompanies an accompanying person, this accompanying person from entering the security room. Further, this type of entry-and-exit system is unsatisfactory in terms of convenience in that the regular user is requested to make a primary authentication registration in order for the regular user to let this accompanying person through the security room.

By contrast, there is an entry-and-exit system which enables a friend and an acquaintance to enter the security room without being newly registered by authenticating, as the accompanying person with the regular user, a person existing in a pre-designated area when the regular user is authenticated. In this entry-and-exit system, however, the person existing in the pre-designated area is authenticated as the accompanying person with the regular user. Hence, an invalid intruder existing near the regular user is also authenticated, and consequently the entry-and-exit system cannot thereafter detect the once-authenticated invalid intruder as the invalid intruder, resulting in a decline of security.

A device disclosed in the present application aims at detecting a suspicious person.

Means for Solving the Problems

A suspicious person detection device disclosed herein adopts the following means in order to solve the problems given above.

Namely, one aspect of the disclosure is a suspicious person detection device including:

a person detection unit to be capable of detecting a position of a person on a per person basis;

a person tracking unit to continuously trace the person's position detected by the person detection unit; and a suspicious person detection unit to detect a suspicious person on the basis of a tracking result of the person tracking unit, wherein the person tracking unit determines, as an already-authenticated person, a person authenticated when coinciding with a predetermined first condition, and determines, as an accompanying person, a person who coincides with a predetermined second condition related to the already-authenticated person when authenticated, and the suspicious person detection unit, when the accompanying person is distanced at a predetermined first distance or longer from the already-authenticated person, issues an alarm.

Effects of the Invention

According to one aspect of the disclosure, it is feasible to detect the suspicious person.

BRIEF DESCRIPTION OF THE DRAWINGS

FIG. 4 is a diagram depicting an example of an authentication information database 122.

FIG. 5 is a diagram depicting an example of a person information database 124.

FIG. 9 is a diagram depicting an example of how items of information in the person information database 124 are changed.

FIG. 13 is a view depicting an example of the users in the environment as in FIG. 3.

FIG. 14 is a diagram depicting an example of how the items of information in the person information database 124 are changed.

FIG. 20 is a diagram depicting an example of an accompanying-enabled distance conversion table.

FIG. 21 is a flowchart illustrating an example (1) of an operation flow of the monitoring system.

FIG. 22 is a flowchart illustrating an example (2) of the operation flow of the monitoring system.

FIG. 23 is a diagram illustrating an example of the monitoring system.

FIG. 24 is a diagram depicting an example of a room information database 126.

FIG. 26 is a diagram depicting an example of a person information database 125.

FIG. 28 is a flowchart illustrating an example (2) of the operation flow of the monitoring system.

DESCRIPTION OF EMBODIMENTS

Embodiments will hereinafter be described with reference to the drawings. Configurations in the embodiments are exemplifications, and the present invention is not limited to the configurations in the embodiments.

First Embodiment

Figure 1:
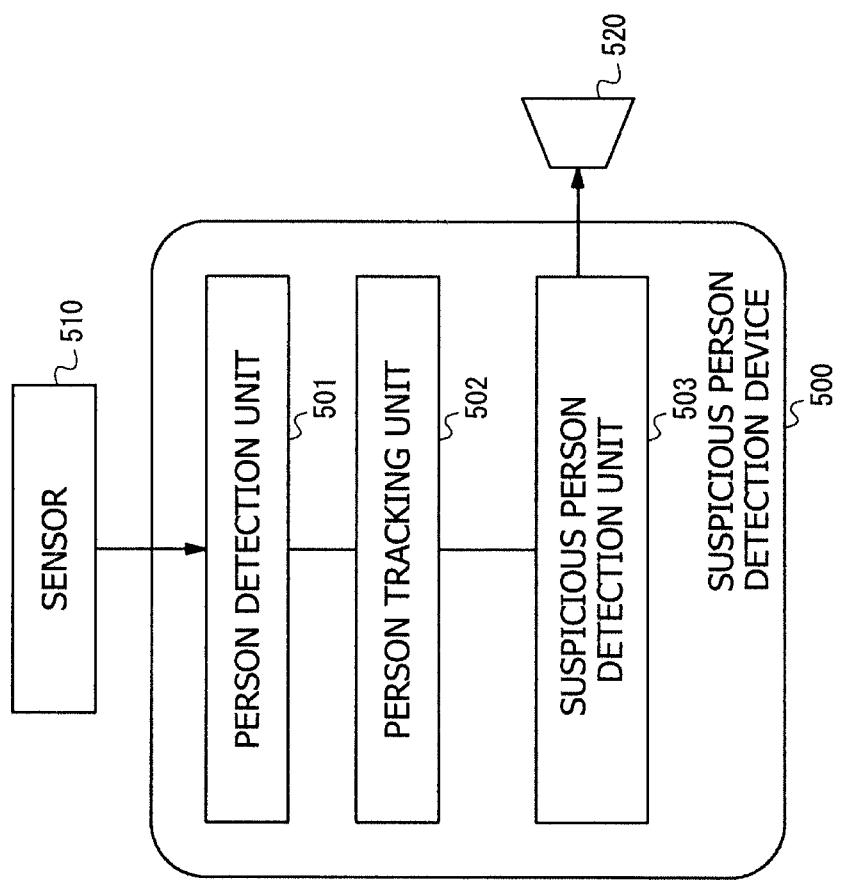
FIG. 1 is a diagram depicting an example of a suspicious person detection device.

FIG. 1 is a diagram illustrating an example of a suspicious person detection device in a first embodiment. A suspicious person detection device 500 includes a person detection unit 501, a person tracking unit 502 and a suspicious person detection unit 503. The suspicious person detection device 500 is connected to a sensor 510 and an external device 520.

The sensor 510 is capable of acquiring information which enables a position of an object to be detected. The sensor 510 can be exemplified such as a still camera, a video camera and a multi-laser scanner. The sensor 510 transmits the information for detecting the position of the object to the suspicious person detection device 500 at an interval of predetermined time.

The person detection unit 501 detects a position of a person on a person-by-person basis. In the example of FIG. 1, the person detection unit 501 detects, based on the information given from the sensor 510, the position of the person on the person-by-person basis.

The person tracking unit 502 continuously tracks the position of the person detected by the person detection unit 501. The person tracking unit 502 determines, as an already-authenticated person, a person who has been authenticated as a result of coinciding with a predetermined first condition and also determines, as an accompanying person, a person who coincides with a predetermined second condition related to the already-authenticated person when in the authentication.

The predetermined first condition is exemplified such that authentication information held by the suspicious person detection device and information that is inputted by a user, are collated and become coincident with each other. Further, the predetermined first condition is exemplified such that a predetermined door is unlocked by use of a key etc.

The predetermined second condition related to the already-authenticated person is exemplified such that a distance from the already-authenticated person is shorter than a predetermined second distance.

The person detection unit 501 and the person tracking unit 502 may also operate as a single piece of person position detecting/tracking unit.

The suspicious person detection unit 503 detects a suspicious person on the basis of a tracking result of the person tracking unit 502. The suspicious person detection unit 503 measures, based on the tracking result of the person tracking unit 502, a distance between the already-authenticated person and the accompanying person. The suspicious person detection unit 503 can, when the accompanying person is distanced at a predetermined first distance or longer from the already-authenticated person, issue an alarm indicating that the accompanying person could be a suspicious person. The person tracking unit 502 can issue the alarm by notifying the external device 520 of the position of the suspicious person, displaying the present position of the suspicious person on the external device 520, and so on. The alarm can be given in the form of sounds, beams of light, display on a screen and a combination thereof.

The external device 520 is a device which outputs the alarm indicating that the suspicious person is detected. The external device 520 is exemplified by a booming speaker, a lamp and a light that perform lighting and flashing, a display for displaying the alarm, and a combination thereof.

Effects of First Embodiment

According to the first embodiment, the suspicious person detection device 500 can determine, as the already-authenticated person, the person who is authenticated because of coinciding with the predetermined first condition and also can determine, as the accompanying person, the person related to the already-authenticated person and coinciding with the predetermined second condition when in authentication. According to the first embodiment, the suspicious person detection device 500 can detect, as the suspicious person, the accompanying person distanced at the predetermined distance or longer from the already-authenticated person on the basis of the tracking result of the person tracking unit 502. The suspicious person detection device 500 is therefore capable of detecting, as the suspicious person, the person who masquerades as the accompanying person and exists near to the already-authenticated person when in authentication.

Second Embodiment

Example of Architecture

Figure 2:
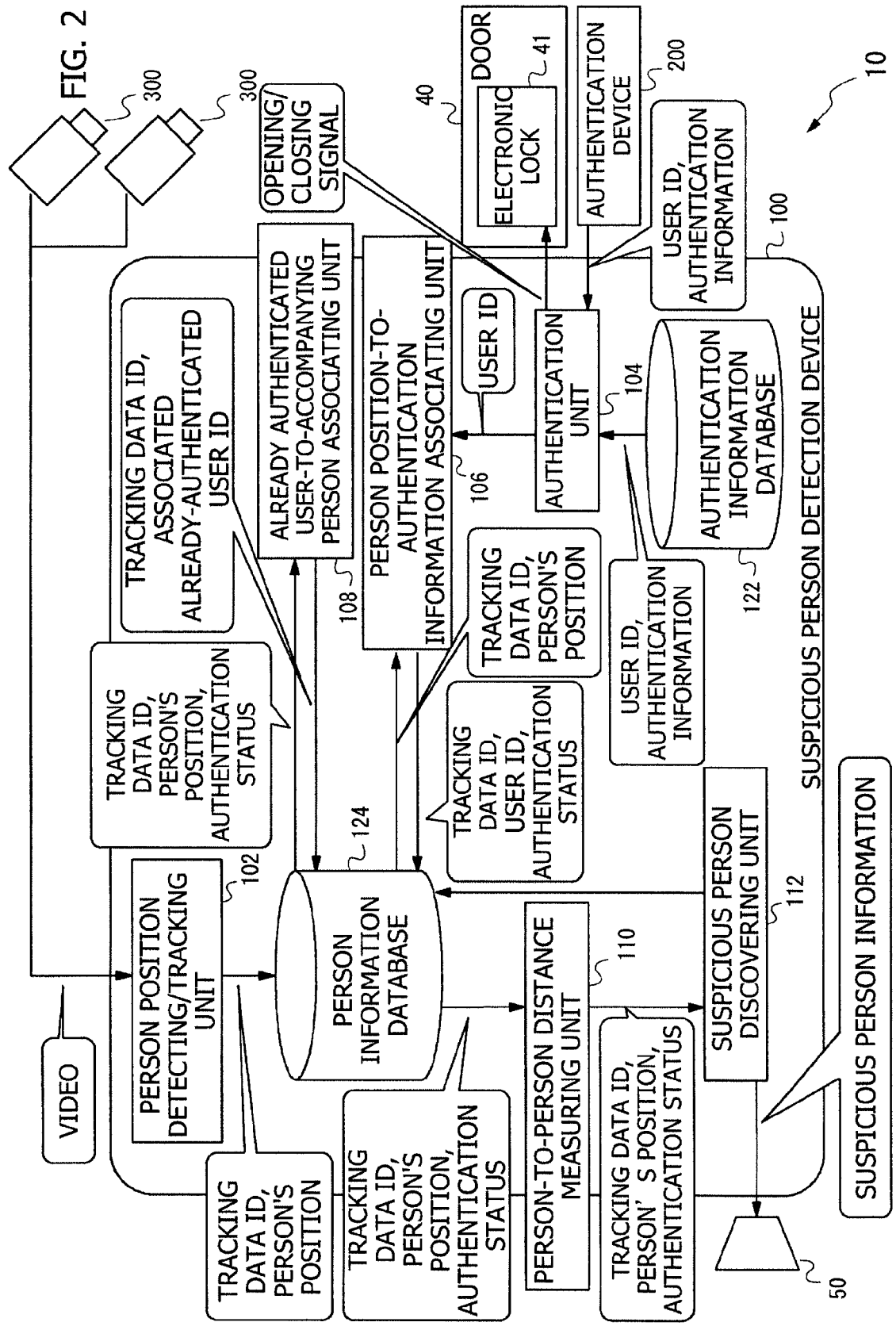
FIG. 2 is a diagram illustrating an example of a monitoring system.

FIG. 2 is a diagram depicting an example of an architecture of a monitoring system 10 by way of a second embodiment. The monitoring system 10 includes a suspicious person detection device 100, an authentication device 200, an imaging device 300, a door 40 and an external device 50.

Figure 3:
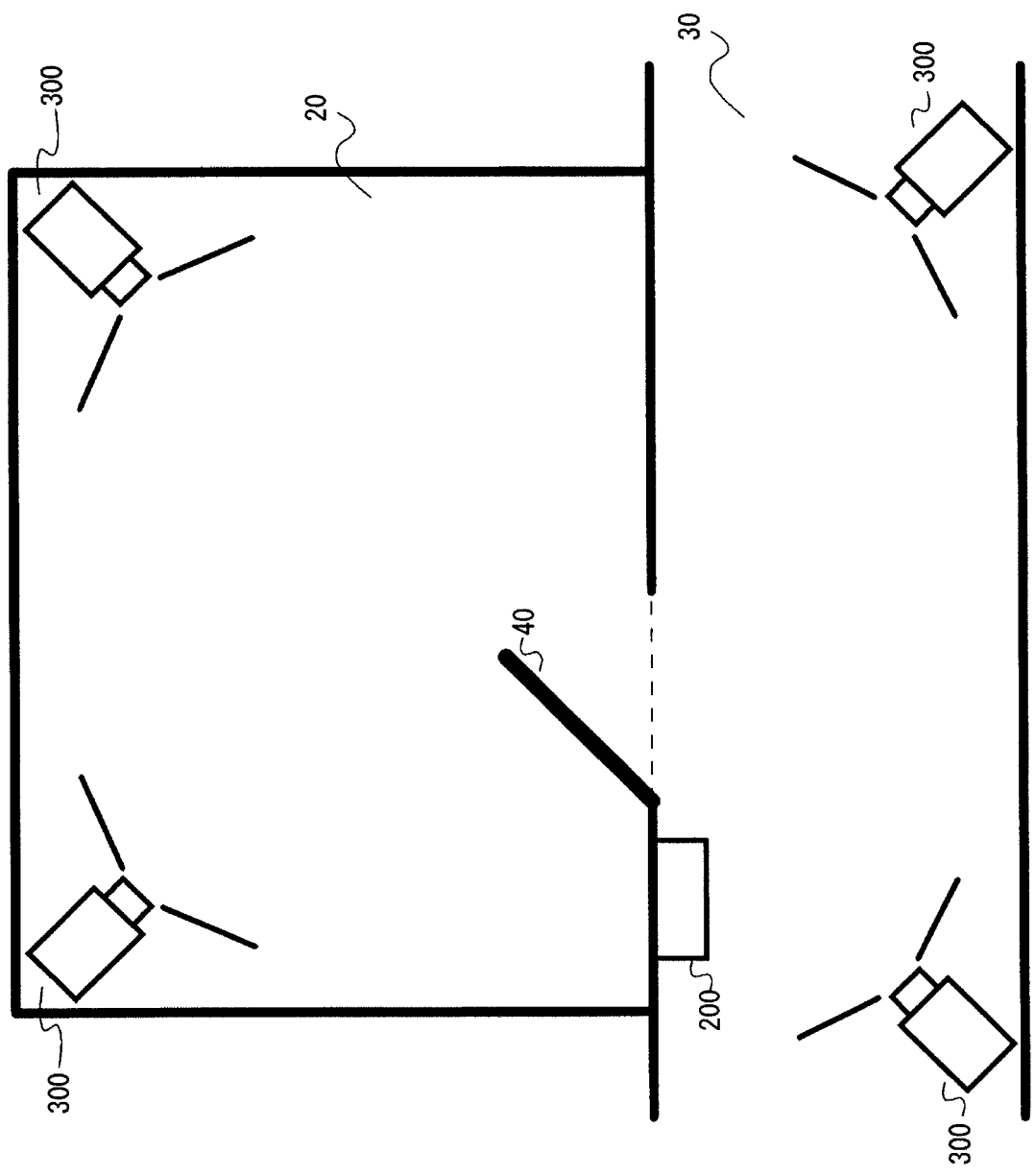
FIG. 3 is a view depicting an example of a room and a passage.

FIG. 3 is a view depicting an example of a room 20 and a passage 30, to which the monitoring system 10 according to the second embodiment is applied. Herein, the room 20 is a management area, and a monitoring area is defined by the room 20 and the passage 30. The room 20 and the passage 30 are partitioned by a wall and the door 40. The door 40 opens, whereby the room 20 communicates with the passage 30. The door 40 is normally locked. The authentication device 200 is installed in the vicinity of the door 40 on the side of the passage 30. The imaging devices 300 are installed in the room 20 and the passage 30 so that an image of the person existing in the monitoring area can be captured. In the example of FIG. 3, the four imaging devices 300 are installed, however, the number of the imaging devices 300 can be determined correspondingly to the monitoring area. The suspicious person detection device 100 can be, as far as output signals of the imaging devices 300 can be obtained via communication lines, installed in the room 20, the passage 30 and other places.

The monitoring system 10 grasps the position of the person existing in the monitoring area, and detects the suspicious person existing in the management area. The monitoring area is an area where the monitoring system 10 grasps the position of the person. The management area is an area where the monitoring system 10 detects the suspicious person. The monitoring area includes the management area.

The suspicious person detection device 100 depicted in FIG. 2 detects the suspicious person on the basis of a result of the authentication made by the authentication device 200 and an image etc captured by the imaging device 300.

The suspicious person detection device 100 includes a person position detecting/tracking unit 102, an authentication unit 104, a person position-to-authentication information associating unit 106, an already authenticated user-to-accompanying person associating unit 108, a person-to-person distance measuring unit 110 and a suspicious person discovering unit 112. Further, the suspicious person detection device 100 includes an authentication information database 122 and a person information database 124. The suspicious person detection device 100 is connected to the authentication device 200 and the imaging device 300.

The person position detecting/tracking unit 102 detects and tracks the person. The person position detecting/tracking unit 102 can detect the person from the image (static image, dynamic image) acquired by the imaging device 300 and can trace the detected person. The person position detecting/tracking unit 102 receives an input of the image from the imaging device 300 at an interval of predetermined time. The person position detecting/tracking unit 102 detects the positions of all of the persons existing in the monitoring area from the images inputted from the imaging device 300. The person position detecting/tracking unit 102 tracks the position of the person.

The person position detecting/tracking unit 102 can, if a distance between the position of the person detected from the inputted image and the position of the person whose image is inputted just anterior to the above-inputted image is shorter than a predetermined distance, consider these persons identical. This predetermined distance is determined based on a time interval at which the image is inputted to the person position detecting/tracking unit 102 and a distance at which a man can move at this time interval. The person position detecting/tracking unit 102 can trace the person by associating the person detected from the inputted image with the person whose image is inputted just anterior to the above-inputted image. The person position detecting/tracking unit 102 stores the detection result and the tracking result in the person information database 124. The person position detecting/tracking unit 102 stores the positions of the persons considered identical as one record of tracking data IDs in the person information database 124.

The authentication unit 104 collates the information inputted by the user to the authentication device 200 with the information in the authentication information database 122. The authentication unit 104, as a result of the collation, if the information inputted by the user to the authentication device 200 is coincident with the information in the authentication information database 122, authenticates the user. The authentication unit 104, when having authenticated the user, unlocks an electronic lock of the door 40 in the management area.

The person position-to-authentication information associating unit 106 associates the authentication information specifying the authenticated user (already-authenticated user) with the position of the person.

The already authenticated user-to-accompanying person associating unit 108 reads the present position of the person and the authentication status thereof from the person information database 124, and thus determines the already-authenticated user associated with a not-yet-authenticated person.

The person-to-person distance measuring unit 110 reads the position of the person from the person information database 124, thereby measuring a distance between the already-authenticated user and the accompanying person.

The suspicious person discovering unit 112 detects, based on the distance between the already-authenticated user and the accompanying person that is measured by the person-to-person distance measuring unit 110, a suspicious person from the persons existing in the management area. The suspicious person discovering unit 112 can issue the alarm by notifying the external device 50 of the position of the suspicious person, displaying the present position of the suspicious person on the external device 50, and so on.

FIG. 4 is a diagram depicting an example of the authentication information database 122. The authentication information database 122 is stored with pieces of information on the users enabled to enter the management area. The authentication information database 122 is stored with records each containing a user ID (user ID field) for managing the authentication information of the users, a name (name field) of each of the already-authenticated users, registered authentication information (registered authentication information field), etc. The registered authentication information is exemplified such as a password and biometric information. The biometric information is exemplified such as fingerprint information, vein information and iris information.

FIG. 5 is a diagram depicting an example of the person information database 124. The person information database 124 is stored with pieces of information on the persons existing in the monitoring area. The person information database 124 is stored with records each containing a tracking data ID (tracking data ID field) for managing the tracking data on the person-by-person basis, a user ID (user ID field) specifying which person the tracking data is related to, an authentication status (authentication status field), an associated already-authenticated user ID (associated already-authenticated user ID field), a present person's position (person's position field), a moving trajectory ("moving trajectory" field) (past positions), etc. The authentication status is information indicating whether the user is the already-authenticated person or the not-yet-authenticated person. The associated already-authenticated user ID is information that specifies which already-authenticated user accompanies the accompanying person concerned.

The authentication device 200 accepts inputs of pieces of information such as the user IDs and the passwords from which the users can be specified, from the persons (users) entering the management area. The authentication device 200 is installed in the vicinity of an entrance of the management area. The authentication device 200 transmits the information inputted by the users to the suspicious person detection device 100.

The authentication device 200 can display a dialog for authenticating the user on the display and can accept the information such as the user ID and the authentication information from the user. The authentication information is exemplified by, e.g., the password, the biometric information, etc. The biometric information is exemplified such as the fingerprint information, the vein information and the iris information.

The periphery to the authentication device 200 is covered by the monitoring area. Hence, the imaging device 300 captures an image of the person existing in the periphery to the authentication device 200.

The imaging device 300 captures the image for grasping the position of the person existing in the monitoring area. The imaging device 300 captures the images in the monitoring area throughout. In the example of FIG. 2, there are the two imaging devices 300, however, the number of the imaging devices is not limited to "2". The imaging devices 300 are installed to enable the images to be captured in the overall monitoring area.

The imaging device 300 captures the image at a predetermined frame rate. For example, the imaging device 300 can capture the image in the monitoring area at an interval of 1/30 sec and can obtain the static image at the interval of 1/30 sec. The imaging device 300 may be a still camera capable of capturing the static image at the interval of 1/30 sec and may also be a video camera capable of capturing the dynamic images (video). The imaging device 300 is installed, e.g., at a ceiling in the monitoring area. The images obtained in a predetermined image format through the imaging process by the imaging device 300 are inputted at the interval of 1/30 sec to the suspicious person detection device 100 via wired or wireless communications.

The door 40 is a door by which the monitoring area and the management area are partitioned. The door 40 is equipped with an electronic lock 41. The electronic lock 41 of the door 40 unlocks or locks the door 40 on the basis of opening/closing signals of the authentication unit 104.

The external device 50 is a device which outputs the alarm indicating that the suspicious person is detected. The external device 50 is exemplified such as the booming speaker, the lamp and the light that perform lighting and flashing, the display for displaying the alarm, and the combination thereof. The external device 50 may be included by the suspicious person detection device 100.

The suspicious person detection device 100 can be realized by a general-purpose computer such as a personal computer (PC) or a dedicated computer such as a server machine.

The suspicious person detection device 100 can be realized by using the dedicated computer or the general-purpose computer such as a workstation (WS) or the PC or by using electronic equipment mounted with the computer. Further, the suspicious person detection device 100 can be realized by using portable electronic equipment mounted with the dedicated computer or the general-purpose computer.

The computer, i.e., an information processing device includes a processor, a main storage device and an interface device with peripheral devices such as a secondary storage device and a communication interface device. The main storage device and the secondary storage device are non-transitory computer-readable media.

The processor loads a program stored on the recording medium into an operation area on the main storage device and executes the program, while the peripheral equipment is controlled through the execution of the program, whereby the computer can realize a function which meets a predetermined purpose.

The processor is, e.g., a CPU (Central Processing Unit) or a DSP (Data Signal Processor). The main storage device includes, e.g., a RAM (Random Access Memory) and a ROM (Read Only Memory).

The secondary storage device is, e.g., an EEPROM (Erasable Programmable ROM) or a hard disk drive (HDD). Further, the secondary storage device can include a removable medium, i.e., a portable recording medium. The removable medium is, e.g., a USB (Universal Serial Bus) memory or a disk recording medium such as a CD (Compact Disk) and a DVD (Digital Versatile Disk).

The communication interface device is, for instance, a LAN (Local Area Network) interface board or a wireless communication circuit for the wireless communications.

The peripheral devices includes, in addition to the secondary storage device and the communication interface device, an input device such as a keyboard and a pointing device and an output device such as a display device and a printer. Further, the input device can include a video/image input device such as a camera and a voice input device such as a microphone. Moreover, the output device can include a voice output device such as a speaker.

The processor loads the programs stored on the secondary storage device into the main storage device and executes the programs, whereby the computer capable of realizing the suspicious person detection device 100 realizes the functions as the person position detecting/tracking unit 102, the authentication unit 104, the person position-to-authentication information associating unit 106, the already authenticated user-to-accompanying person associating unit 108, the person-to-person distance measuring unit 110 and suspicious person discovering unit 112. On the other hand, the authentication information database 122 and the person information database 124 are provided in the storage area of the main storage device or the secondary storage device.

Operational Example

Figure 6:
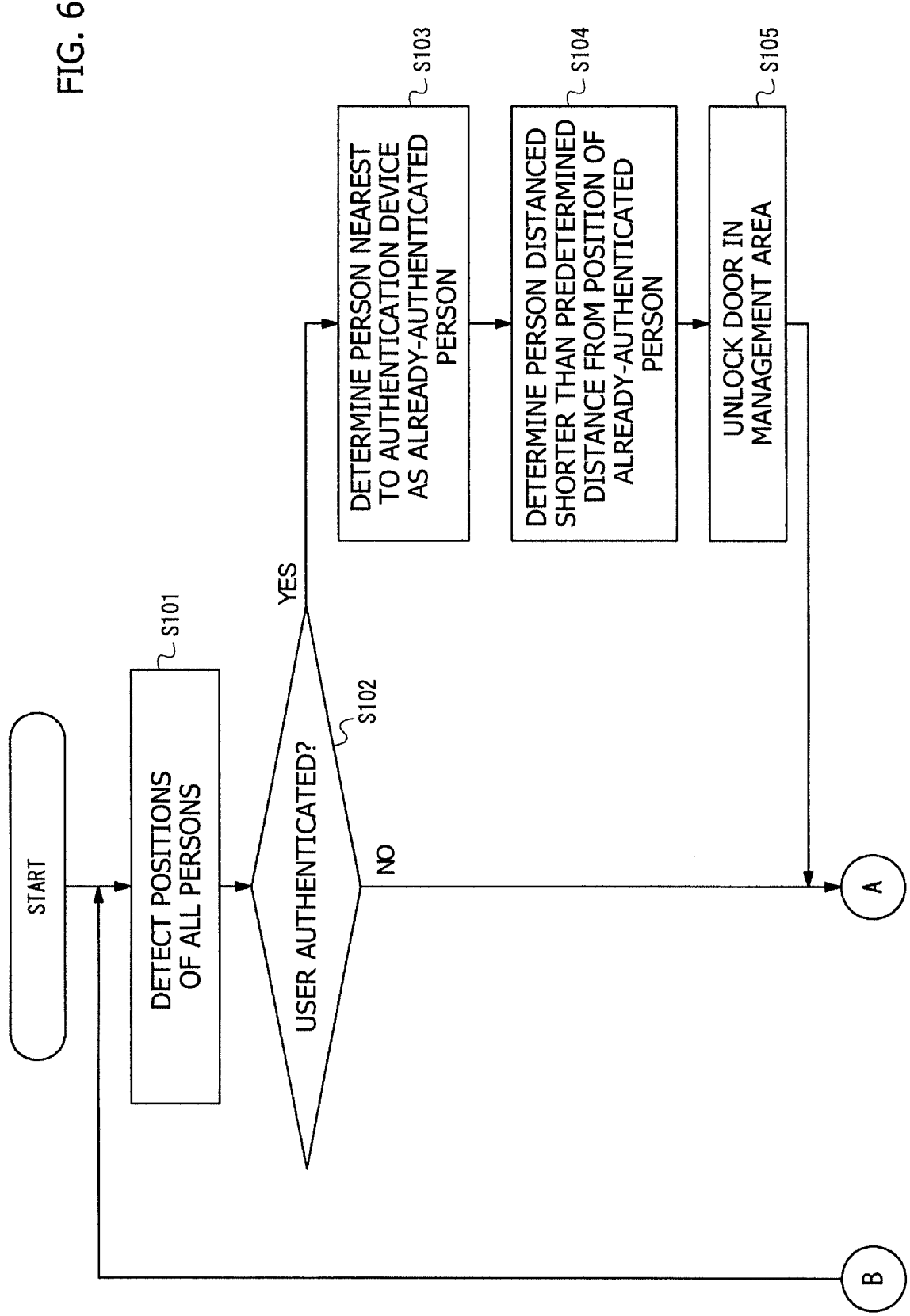
FIG. 6 is a flowchart illustrating an example (1) of an operation flow of the monitoring system.
Figure 7:
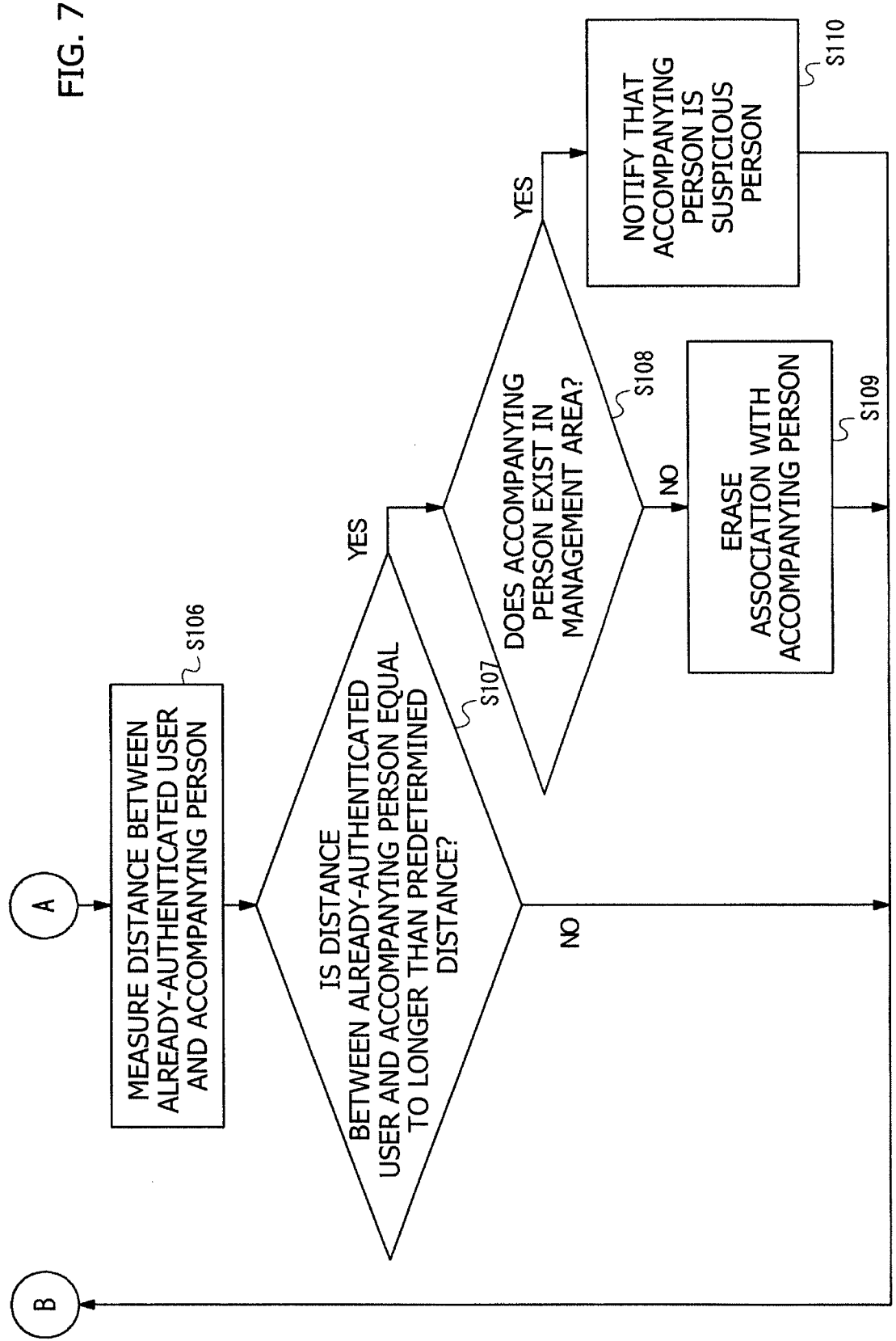
FIG. 7 is a flowchart illustrating an example (2) of the operation flow of the monitoring system.

FIGS. 6 and 7 are flowcharts illustrating an example of an operation flow of the monitoring system 10. Symbols "A" and "B" in FIG. 6 connect with "A" and "B" in FIG. 7, respectively.

Upon a startup of the monitoring system 10, the imaging device 300 captures the images over the monitoring area and transmits the captured images to the person position detecting/tracking unit 102 of the suspicious person detection device 100.

The person position detecting/tracking unit 102 receives the images from the imaging device 300. The person position detecting/tracking unit 102 detects the positions of all of the persons existing in the monitoring area from the received images (FIG. 6: S101). There are, e.g., a back projection method and a method using a Kalman filter by way of a method of detecting the position of the person (e.g., Non-Patent document 1). The person position detecting/tracking unit 102 continuously tracks the persons existing in the monitoring area.

The person position detecting/tracking unit 102 allocates a tracking data ID to every person who is newly detected, and records the tracking data ID together with the present position of this person in the person information database 124. At this time, the person position detecting/tracking unit 102 determines "No ID" as a value in the user ID field, "Not-yet-authenticated" as a value in the authentication status field and "No ID" as a value in the associated already-authenticated user ID field, thus recording these values in the person information database 124. Further, the person position detecting/tracking unit 102 records, with respect to the person who has already been detected, the present position of the person concerned in the record specified by the tracking data ID field associated with this person.

On the other hand, the authentication device 200 accepts the inputs of the user ID and the authentication information (password etc) from the user. The authentication device 200 transmits the inputted user ID and authentication information to the authentication unit 104 of the suspicious person detection device 100. The authentication unit 104 extracts, based on the user ID transmitted from the authentication device 200, the registered authentication information associated with the user ID from the authentication information database 122. The authentication unit 104 compares the authentication information transmitted from the authentication device 200 with the registered authentication information extracted from the authentication information database 122, and thus determines whether these pieces of authentication information are coincident with each other or not. If these pieces of information are coincident, the authentication unit 104 authenticates the user concerned. Namely, the user becomes the already-authenticated user. Whereas if these pieces of information are not coincident, the authentication unit 104 does not authenticate the user. Further, the authentication unit 104, if the user ID concerned does not exist in the authentication information database 122, does not authenticate this user. The already-authenticated user can enter the management area. The user who is not authenticated is disabled from entering the management area.

The authentication unit 104 checks whether the user is authenticated or not (S102). If the user is authenticated (S102; YES), the authentication unit 104 transmits the user ID of the already-authenticated user to the person position-to-authentication information associating unit 106.

The person position-to-authentication information associating unit 106 extracts, from the person information database 124, the tracking data ID of the person about which the authentication status is "Not-yet-authenticated" and who has the shortest distance in position from the authentication device 200. The person position-to-authentication information associating unit 106 previously holds the information on the position of the authentication device 200. The person position-to-authentication information associating unit 106 considers the person having this extracted tracking data ID to be the already-authenticated user. The person position-to-authentication information associating unit 106 records the user ID of the already-authenticated user in the record specified by the thus-extracted tracking data ID field in the person information database 124 (S103). Moreover, the person position-to-authentication information associating unit 106 records "Already-authenticated" in the authentication status field of the record specified by the extracted tracking data ID in the person information database 124.

In the example of FIG. 5, "000001" is recorded in the user ID field and "Already-authenticated" is recorded in the authentication status field of the record specified by "001" given in the tracking data ID field in the person information database 124. Further, in the example of FIG. 5, "000003" is recorded in the user ID field and "Already-authenticated" is recorded in the authentication status field of the record specified by "003" given in the tracking data ID field in the person information database 124. These items of data represent that the persons (records) specified by "001" and "003" given in the tracking data ID field are identical with the persons (the already-authenticated users) whose user IDs are "000001" and "000003", respectively.

The already authenticated user-to-accompanying person associating unit 108 extracts, from the person information database 124, the tracking data ID of the person about which the authentication status is "Not-yet-authenticated" and who is distanced at the predetermined distance or shorter from the position of the already-authenticated user authenticated in step S103. The already authenticated user-to-accompanying person associating unit 108 considers the person specified by this extracted tracking data ID is the accompanying person (the accompanying person with the already-authenticated user) with the person considered to be the already-authenticated user in step S103. The already authenticated user-to-accompanying person associating unit 108 records the user ID of this already-authenticated user in the associated already-authenticated user ID field of the record specified by the extracted tracking data ID in the person information database 124 (S104).

In the example of FIG. 5, "000001" is recorded in the already-authenticated user ID field of the record specified by "002" given in the tracking data ID field in the person information database 124. This data indicates that the person specified by "002" given in the tracking data ID field is the accompanying person with the person (the already-authenticated user) whose user ID is "000001".

The authentication unit 104 unlocks the door 40 of the room 20 in the management area (S105). The authentication unit 104 transmits the opening/closing signal for unlocking to the electronic lock 41 of the door 40, thereby unlocking the door 40. The already-authenticated user and the accompanying person therewith can enter the room 20 in the management area from the passage 30 upon unlocking the door 40. The authentication unit 104 can lock the door 40 after an elapse of a predetermined period of time since the door 40 has been unlocked. The authentication unit 104 can lock the door 40 by transmitting the opening/closing signal for instructing the lock 41 to be locked to the electronic lock 41 of the door

40. Further, the authentication unit 104, when the door 40 is once opened and closed thereafter, enables the door 40 to be locked.

If the user is not authenticated (S102; NO) and if the authentication unit 104 unlocks the door 40 in the management area (S105), the person-to-person distance measuring unit 110 measures a distance between the position of the already-authenticated user and the position of the accompanying person therewith (FIG. 7: S106). The person-to-person distance measuring unit 110 extracts, from the person information database 124, information on the person about which the authentication status is "Not-yet-authenticated" and who holds the associated already-authenticated user ID. The extracted person is the accompanying person with the already-authenticated user. The person-to-person distance measuring unit 110 extracts information on the already-authenticated user associated with the extracted accompanying person from the person information database 124. The person-to-person distance measuring unit 110 measures a distance between the position of the extracted already-authenticated user and the position of the accompanying person therewith (which is referred to as an already-authenticated user-to-accompanying person distance). The person-to-person distance measuring unit 110 transmits, to the suspicious person discovering unit 112, the items of information on the accompanying person and the already-authenticated user, which contain the tracking data ID of the accompanying person, the present position of the accompanying person, the already-authenticated user-to-accompanying person distance and the user ID of the already-authenticated user.

The suspicious person discovering unit 112 checks whether or not the already-authenticated user-to-accompanying person distance measured by the suspicious person detection device 100 is equal to or longer than the predetermined distance (S107). The suspicious person discovering unit 112 checks with respect to all of the accompanying persons whether or not the already-authenticated user-to-accompanying person distance is equal to or longer than the predetermined distance. This predetermined distance may be the same distance as and may also be different from the predetermined distance in step S104.

If all of the already-authenticated user-to-accompanying person distances are not equal to or longer than the predetermined distance (S107; NO), the suspicious person detection device 100 repeats the processes from step S101 onward.

If the already-authenticated user-to-accompanying person distance is equal to or longer than the predetermined distance (S107; YES), the suspicious person discovering unit 112 checks whether or not the accompanying person whose already-authenticated user-to-accompanying person distance is equal to or longer than the predetermined distance exists within the management area (S108). The suspicious person discovering unit 112 can check, based on whether or not the present position of this accompanying person is within the management area, whether this accompanying person exists within the management area or not.

If this accompanying person exists in the management area (S108; YES), the suspicious person discovering unit 112 determines this accompanying person to be a suspicious person. The suspicious person discovering unit 112 notifies the external device 50, an administrator, etc that this accompanying person is the suspicious person (S110). The suspicious person discovering unit 112 can notify the external device 50, the administrator, etc of the present position of this suspicious person.

If this accompanying person does not exist in the management area (S108; NO), the suspicious person discovering unit 112 records "No ID" as a value in the associated already-authenticated user ID field in the record specified by the tracking data ID of this accompanying person in the person information database 124 (S109). This accompanying person is distanced at the predetermined distance or longer from the already-authenticated user, and hence the suspicious person discovering unit 112 determines that this accompanying person is not the accompanying person with the already-authenticated user. Furthermore, this accompanying person does not exist in the management area, and therefore the suspicious person discovering unit 112 does not give any notification saying that this accompanying person is the suspicious person.

The suspicious person discovering unit 112 executes the processes from step S108 onward with respect to all of the accompanying persons whose already-authenticated user-to-accompanying person distances are equal to or longer than the predetermined distance.

When finishing the process in step S109 or step S110, the suspicious person detection device 100 iterates the processes from step S101 onward.

The suspicious person detection device 100 can determine the user authenticated by the authentication unit 104 as the already-authenticated user and can determine, as the accompanying person, the person who is distanced shorter than the predetermined distance from this already-authenticated user. The suspicious person detection device 100 can, if the already-authenticated user and the accompanying person therewith exist within the management area and if the accompanying person gets distanced at the predetermined distance or longer from the already-authenticated user, determine this accompanying person to be the suspicious person.

First Specific Example

A first specific example of the operation of the monitoring system 10 in a case where the configuration of the second embodiment is actually used in (applied to) an environment as depicted in FIG. 3, will be explained.

In the environment of FIG. 3, the room 20 is a room that permits only the users to enter, who are previously registered. Namely, the room 20 is covered by the management area. Further, the room 20 and the passage 30 are covered by the monitoring area. For unlocking the door of the room 20, the user performs an operation for the authentication by the authentication device 200 installed in the vicinity of the entrance of the room 20. Devices such as the imaging devices 300 for detecting the positions o the persons are installed in the monitoring area. The positions of the persons existing within the monitoring area are continuously tracked.

The person position detecting/tracking unit 102 of the suspicious person detection device 100 grasps the position of the person existing in the monitoring area on the basis of the image acquired from the imaging device 300. In the second embodiment, the imaging devices 300 are installed in the room 20 within the management area and in the passage 30 outside the management area, respectively.

Figure 8:
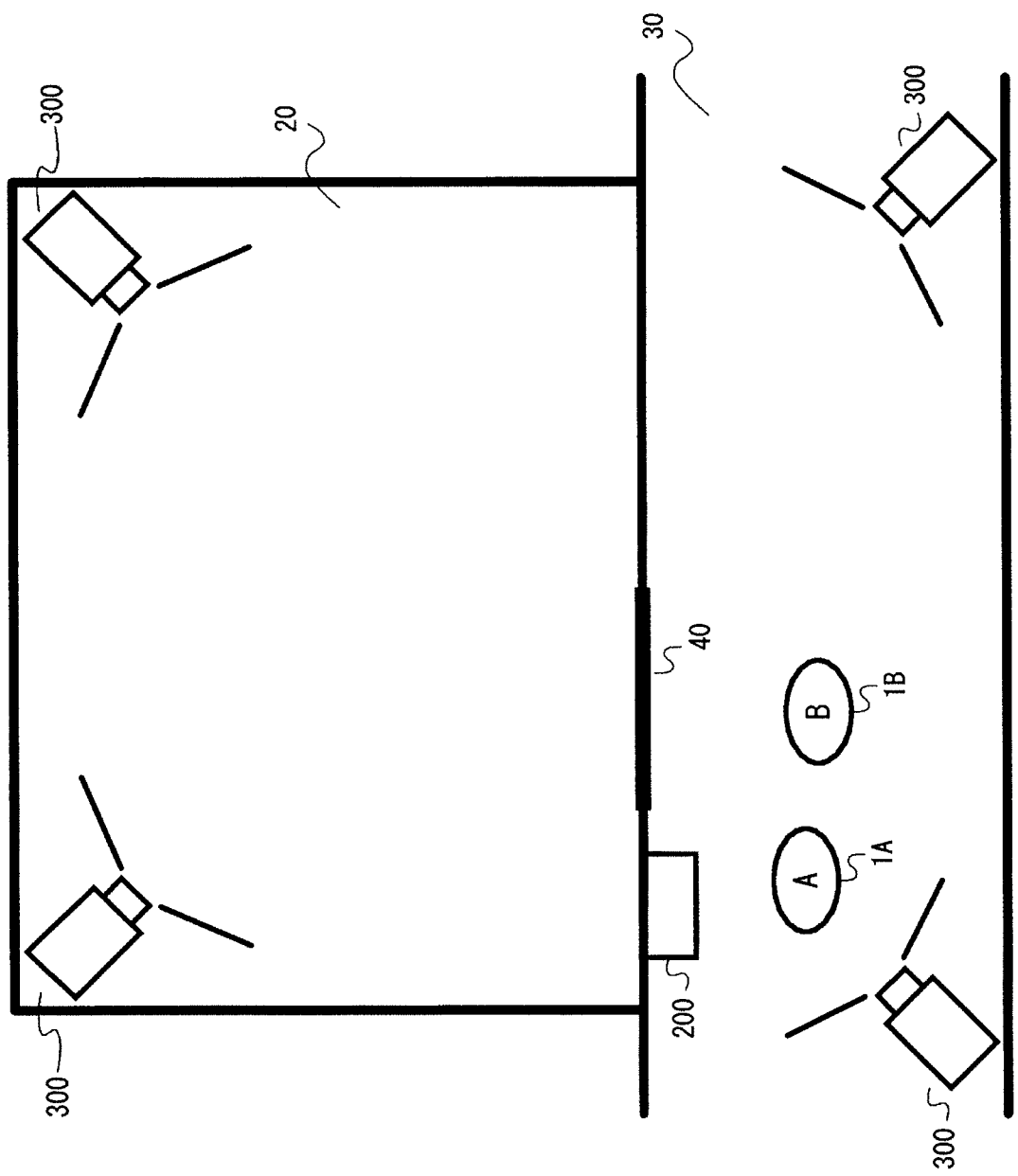
FIG. 8 is a view depicting an example of users in an environment as in FIG. 3.

FIG. 8 is a view depicting an example of the users in the environment as in FIG. 3. In the example of FIG. 8, a user 1A and a user 1B exist in the passage in the monitoring area.

Herein, an assumption is that the user 1A is the user who is registered in the suspicious person detection device 100, while the user 1B is the user who is not registered in the suspicious person detection device 100. Namely, the user 1A is authenticated by the authentication unit 104 of the suspicious person detection device 100 and thus becomes the already-authenticated user. The user 1B is not registered in the suspicious person detection device 100 and is not therefore authenticated by the authentication unit 104.

The user 1A and the user 1B exist in the monitoring area and, and hence the images thereof are captured by the imaging device 300. The suspicious person detection device 100 recognizes the user 1A and the user 1B from the images captured by the imaging device 300. Both of the user 1A and the user 1B are not yet, however, authenticated at this point of time, and the suspicious person detection device 100 can not therefore determine who is the user 1A or the user 1B. The suspicious person detection device 100 newly adds the tracking data IDs and the present positions of the user 1A and the user 1B respectively to the person information database 124. The positions of the user 1A and the user 1B are continuously tracked by the suspicious person detection device 100.

FIG. 9 is a diagram depicting an example of how the items of information in the person information database 124 are changed. At the present point of time before the user 1A is authenticated, it follows that with respect to the user 1A, "No ID" is set in the user ID field, "Not-yet-authenticated" is set in the authentication status field and "No ID" is set in the associated already-authenticated user ID field. Further similarly, it follows that with respect to the user 1B, "No ID" is set in the user ID field, "Not-yet-authenticated" is set in the authentication status field and "No ID" is set in the associated already-authenticated user ID field (FIG. 9: (1)).

Figure 10:
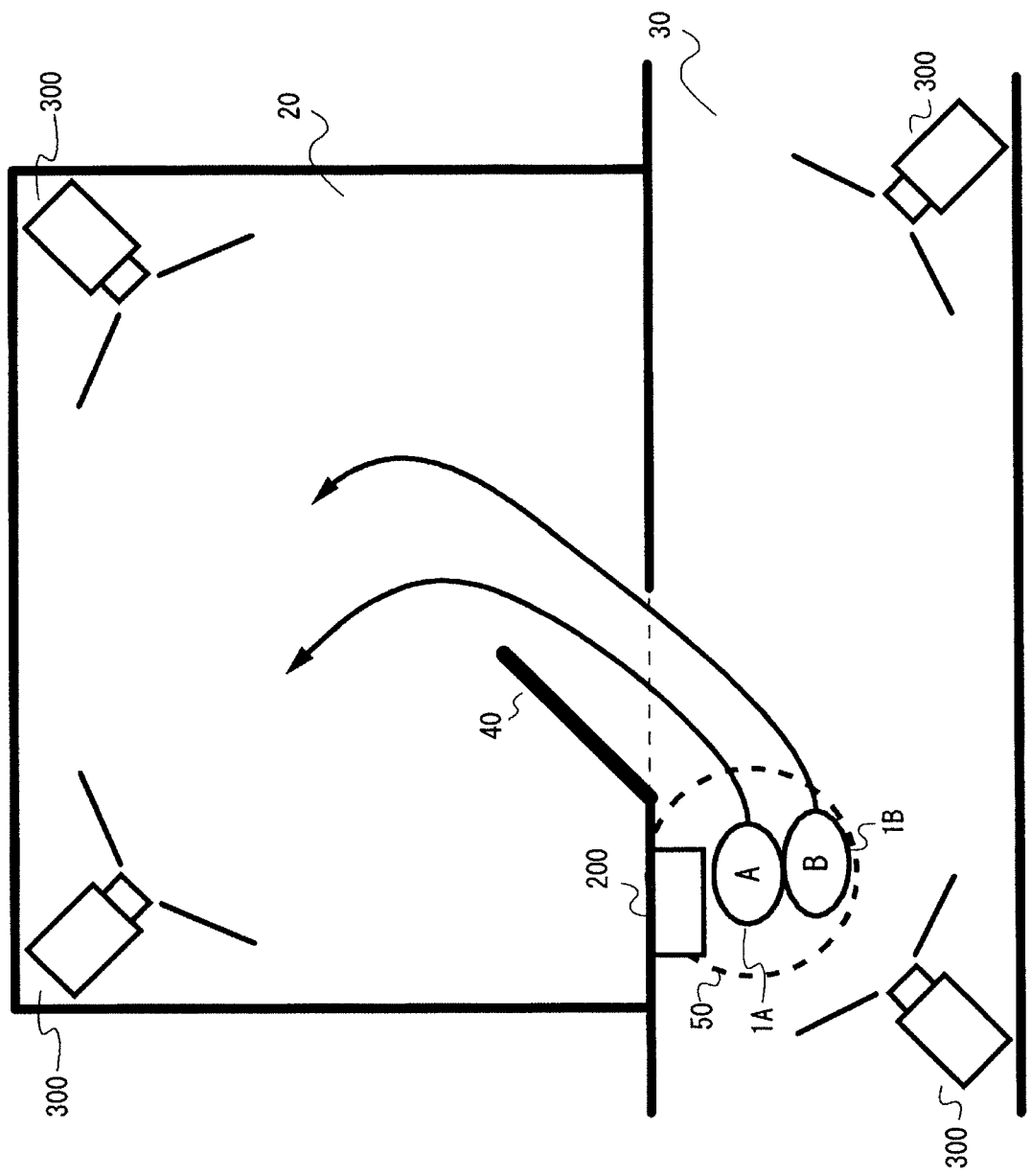
FIG. 10 is a view illustrating an example of a case where the users enter a management area.

FIG. 10 is a view depicting an example in the case where the user enters the management area. The user 1A inputs the user ID and the password by using the authentication device 200. The authentication device 200 transmits the inputted items of information to the suspicious person detection device 100. The suspicious person detection device 100 collates the information stored on the authentication information database 122 with the information inputted to the authentication device 200. The suspicious person detection device 100, as a result of the collation, if the inputted information is coincident with the information stored on the authentication information database 122, authenticates the user 1A. At this time, the suspicious person detection device 100 determines that the person located at the shortest distance from the position of the authentication device 200 is the user 1A. Moreover, the suspicious person detection device 100 determines that the person existing in a range 50 that is shorter than the predetermined distance from the user 1A, who is the authenticated user (already-authenticated user), is the accompanying person with the user 1A. In the example of FIG. 10, the suspicious person detection device 100 determines that the user 1B is the accompanying person with the user 1A.

The suspicious person detection device 100 records the ID of the user 1A in the user ID field and "Already-authenticated" in the authentication status field by way of the record of the user 1A in the person information database 124. Further, the suspicious person detection device 100 records the ID of the user 1A in the associated already-authenticated user ID field by way of the record of the user 1B in the person information database 124 (FIG. 9: (2)).

When the user 1A is authenticated by the suspicious person detection device 100, the suspicious person detection device 100 unlocks the door 40 at the entrance of the room 20 as the management area. The user 1A and the user 1B can enter the room 20 as the management area from the door 40. The user 1B is not the authenticated user and is therefore disabled from entering solely the room 20. The user 1B can, however, enter the room 20 together with the user 1A as the accompanying person with the user 1A who is the already-authenticated user. The suspicious person detection device 100 can lock the door 40 after the elapse of the predetermined period of time since the door 40 has been unlocked in a way that inhibits the person who is neither the already-authenticated user nor the accompanying person from entering the management area.

At this point of time, it follows that with respect to the user 1A, the ID of the user 1A is set in the user ID field, "Already-authenticated" is set in the authentication status field and "No ID" is set in the associated already-authenticated user ID field. Further, similarly, it follows that with respect to the user 1B, "No ID" is set in the user ID field, "Not-yet-authenticated" is set in the authentication status field and the ID of the user 1A is set in the associated already-authenticated user ID field (FIG. 9: (3)).

Figure 11:
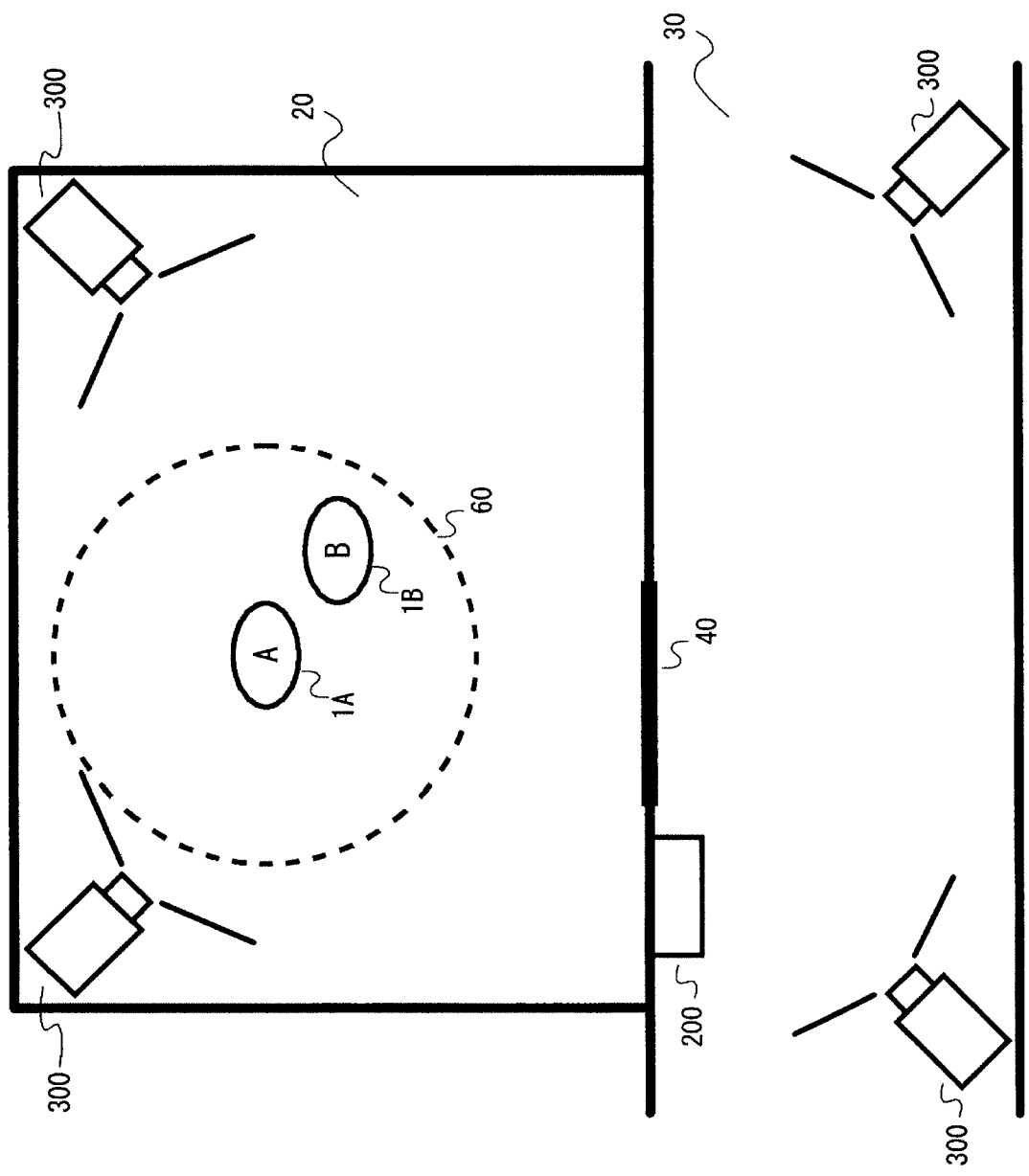
FIG. 11 is a view illustrating an example of a case where the users exist in the management area.
Figure 12:
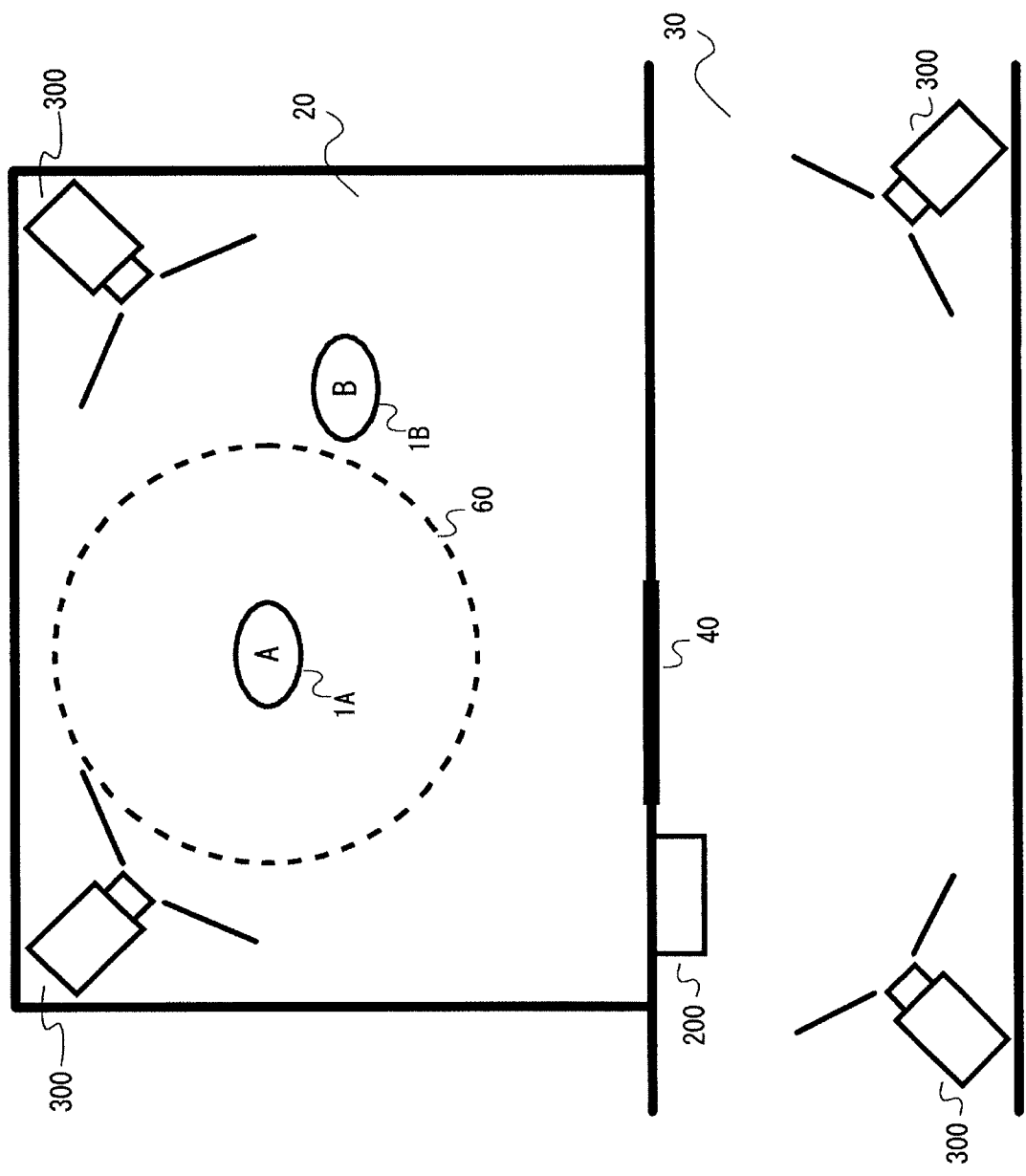
FIG. 12 is a view illustrating an example of the case where the users exist in the management area.

FIGS. 11 and 12 are views illustrating examples where the users exist in the management area. The suspicious person detection device 100 always measures a distance between the position of the user 1A as the already-authenticated user and the position of the user 1B as the accompanying person with the user 1A.

As in FIG. 11, if the distance between the position of the user 1A and the position of the user 1B is shorter than the predetermined distance (i.e., if the user 1B exists within a range 60), the suspicious person detection device 100 does not determine that the user 1B is the suspicious person. As in FIG. 12, however, whereas if the distance between the position of the user 1A and the position of the user 1B is equal to or longer than the predetermined distance (i.e., if the user 1B exists outside the range 60), the suspicious person detection device 100 determines that the user 1B is the suspicious person.

Second Specific Example

A second specific example of the operation of the monitoring system 10 in a case where the configuration of the second embodiment is actually used in (applied to) the environment as depicted in FIG. 3, will be described. The second specific example has common points to the first specific example. The descriptions of the common points are omitted.

FIG. 13 is a view depicting an example of the users in the environment as in FIG. 3. In the example of FIG. 13, the user 1A, the user 1B and a user 1C exist in the passage 30 defined as the monitoring area.

Herein, it is assumed that the user 1A is the user registered in the suspicious person detection device 100, while the user 1B is the user not registered in the suspicious person detection device 100. Furthermore, the user 1C is assumed to be the user registered in the suspicious person detection device 100. The user 1B is neither registered nor authenticated consequently by the authentication unit 104.

The user 1A, the user 1B and the user 1C exist in the monitoring area, and hence their images are captured by the imaging devices 300. The suspicious person detection device 100 recognizes the user 1A, the user 1B and the user 1C from the images captured by the imaging devices 300. The user 1A, the user 1B and the user 1C are not, however, authenticated at this point of time, and hence the suspicious person detection device 100 can not determine who is the user 1A, the user 1B or the user 1C. The suspicious person detection device 100 newly adds the tracking data IDs and the present positions of the user 1A, the user 1B and the user 1C to the person information database 124. The positions of the user 1A, the user 1B and the user 1C are continuously tracked by the suspicious person detection device 100.

FIG. 14 is diagram illustrating an example of how the items of information in the person information database 124 are changed. None of the users undergo the authentication at the present point of time. Hence, with respect to the user 1A, "No ID" is set in the user ID field, "Not-yet-authenticated" is set in the authentication status field, and "No ID" is set in the associated already-authenticated user ID field. Further, similarly, with respect to the user 1B, "No ID" is set in the user ID field, "Not-yet-authenticated" is set in the authentication status field, and "No ID" is set in the associated already-authenticated user ID field. Moreover, with respect to the user 1C, "No ID" is set in the user ID field, "Not-yet-authenticated" is set in the authentication status field, and "No ID" is set in the associated already-authenticated user ID field (FIG. 14: (1)).

Figure 15:
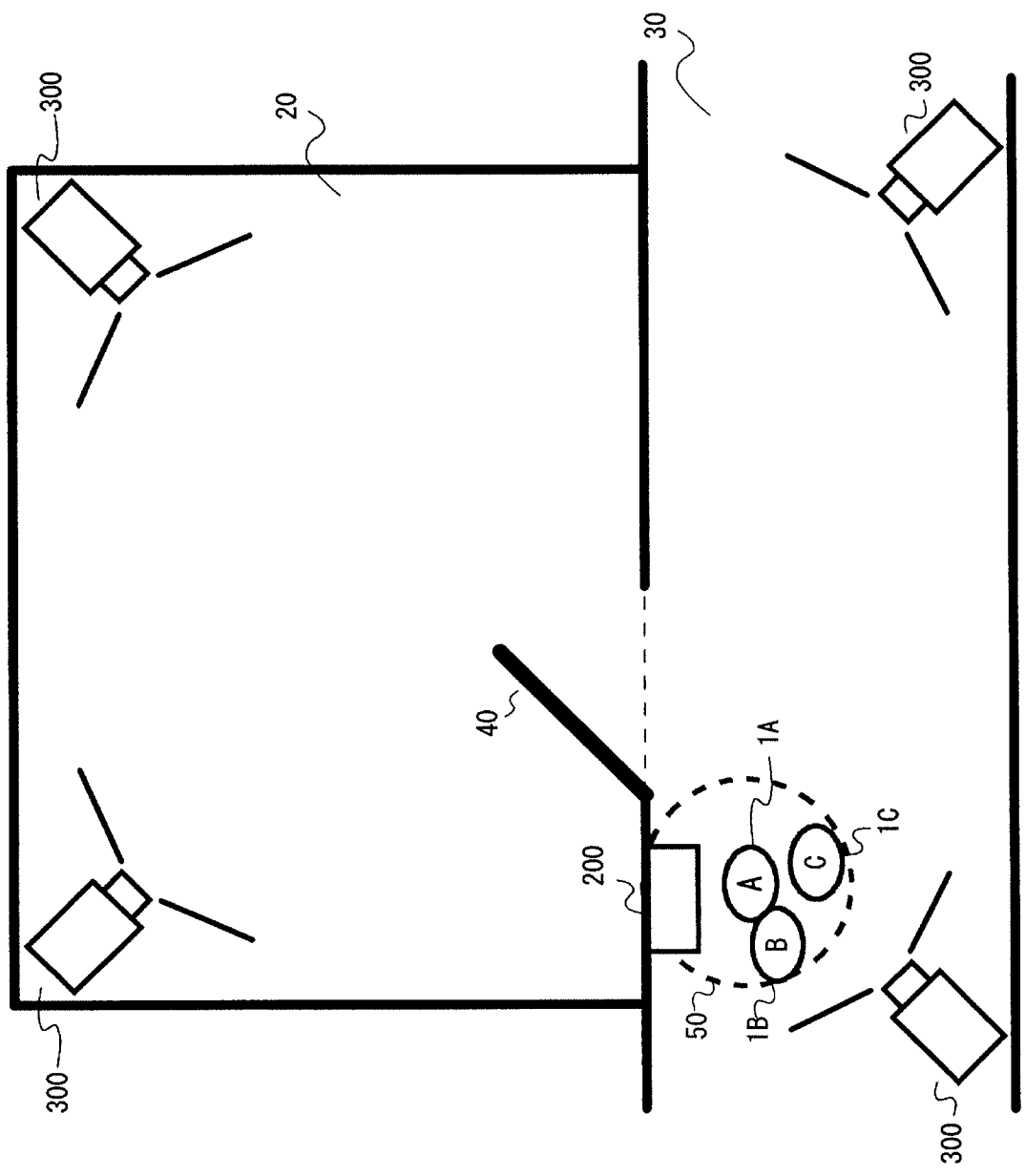
FIG. 15 is a view illustrating an example of the case where the users enter the management area.

FIG. 15 is a view depicting an example in which the users enter the management area. The user 1A inputs the user ID and the password by employing the authentication device 200. The authentication device 200 transmits the inputted items of information to the suspicious person detection device 100. The suspicious person detection device 100 collates the information stored on the authentication information database 122 with the information inputted to the authentication device 200. The suspicious person detection device 100, as a result of the collation, if the inputted information is coincident with the information stored on the authentication information database 122, authenticates the user 1A. At this time, the suspicious person detection device 100 determines that the person located at the shortest distance from the position of the authentication device 200 is the user 1A. Moreover, the suspicious person detection device 100 determines that the person existing in the range 50 that is shorter than the predetermined distance from the user 1A, who is the authenticated user (already-authenticated user), is the accompanying person with the user 1A. In the example of FIG. 15, the suspicious person detection device 100 determines that the user 1B and the user 1C are the accompanying persons with the user 1A.

The suspicious person detection device 100 records the ID of the user 1A in the user ID field and "Already-authenticated" in the authentication status field by way of the record of the user 1A in the person information database 124. Further, the suspicious person detection device 100 records the ID of the user 1A in the associated already-authenticated user ID field by way of the record of the user 1B in the person information database 124. Still further, the suspicious person detection device 100 records the ID of the user 1A in the already-authenticated user ID field by way of the record of the user 1C in the person information database 124 (FIG. 14: (2)).

Figure 16:
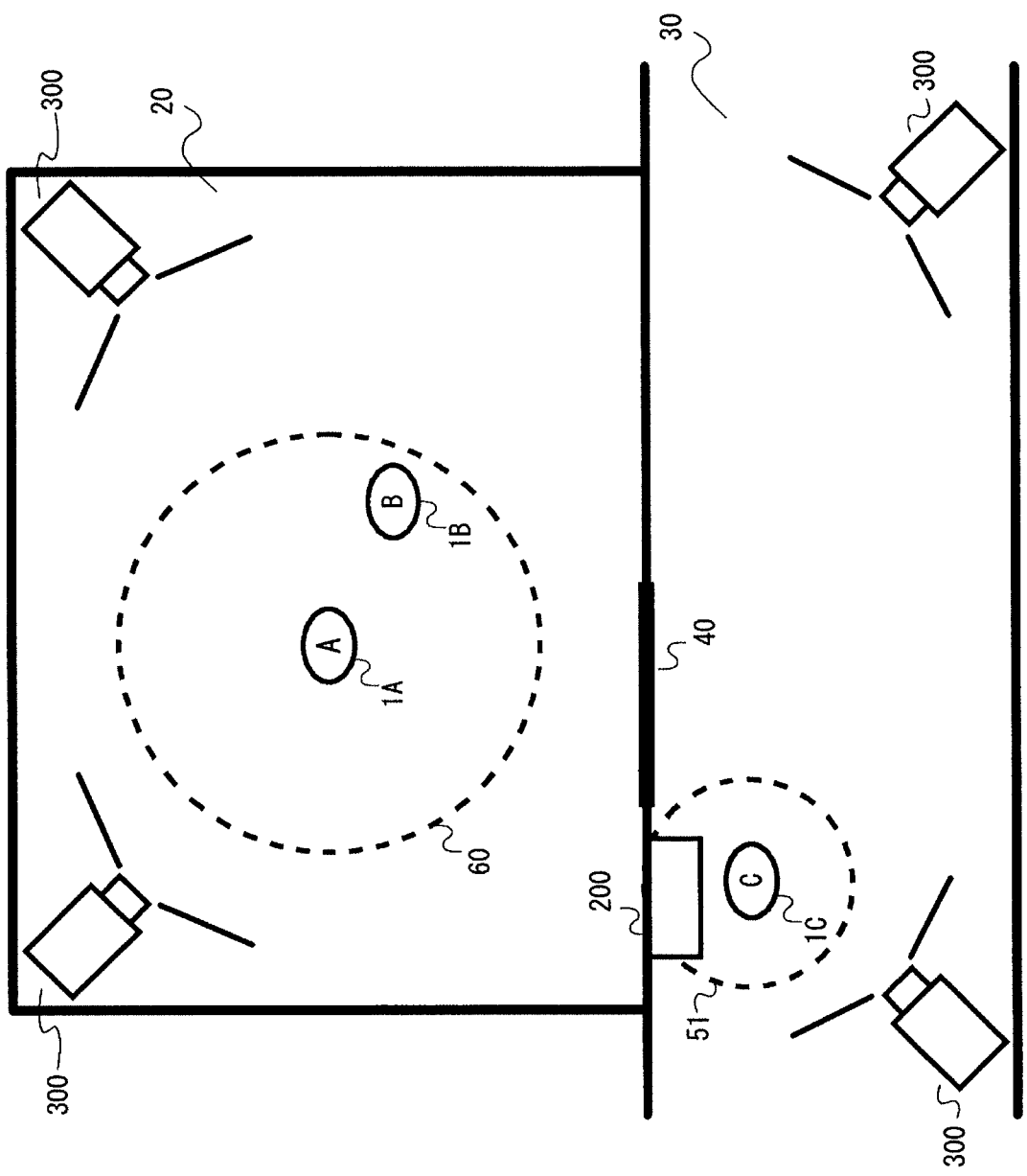
FIG. 16 is a view illustrating an example of the case where a user 1A and a user 1B enter the management area.

FIG. 16 is a view depicting an example in the case where the user 1A and the user 1B enter the management area. When the user 1A is authenticated by the suspicious person detection device 100, the suspicious person detection device 100 unlocks the door 40 at the entrance of the room 20 defined as the management area. The user 1A, the user 1B and the user 1C can enter the room 20 as the management area from the door 40. The user 1C is the registered user and is therefore enabled to become the authenticated user (already-authenticated user) by the user 1C being authenticated by the authentication unit 104 of the suspicious person detection device 100. Hence, herein, the user 1A and the user 1B enter the room 20, but the user 1C does not enter the room 20 together with the user 1A.

The suspicious person detection device 100 always measures a distance between the position of the user 1A as the already-authenticated user and the position of the user 1B as the accompanying person with the user 1A. Further, the suspicious person detection device 100 always measures a distance between the position of the user 1A as the already-authenticated user and the position of the user 1C as the accompanying person with the user 1A.

As in FIG. 16, if the distance between the position of the user 1A and the position of the user 1B is shorter than the predetermined distance (i.e., if the user 1B exists within the range 60), the suspicious person detection device 100 does not determine that the user 1B is the suspicious person.

Moreover, as in FIG. 16, if the distance between the position of the user 1A and the position of the user 1C is equal to or longer than the predetermined distance (i.e., if the user 1C exists outside the range 60) and if existing outside the room 20 defined as the management area, the suspicious person detection device 100 does not determine that the user 1C is the suspicious person. This is because the suspicious person detection device 100 does not determine that the person existing outside the management area is the suspicious person.

The suspicious person detection device 100, however, determines that the user distanced at the predetermined distance or longer from the already-authenticated user is not the accompanying person with this already-authenticated user. In this case, the suspicious person detection device 100 records "No ID" in the associated already-authenticated user ID field by way of the record of the user 1C in the person information database 124 (FIG. 14: (3)).

The user 1C inputs the user ID and the password by employing the authentication device 200. The authentication device 200 transmits the inputted items of information to the suspicious person detection device 100. The suspicious person detection device 100 collates the information stored on the authentication information database 122 with the information inputted to the authentication device 200. The suspicious person detection device 100, as a result of the collation, if the inputted information is coincident with the information stored on the authentication information database 122, authenticates the user 1C. At this time, the suspicious person detection device 100 determines that the person located at the shortest distance from the position of the authentication device 200 is the user 1C. Further, the suspicious person detection device 100 determines that the person existing in a range 51 that is shorter than the predetermined distance from the user 1C, who is the authenticated user (already-authenticated user), is the accompanying person with the user 1C. In the example of FIG. 16, the suspicious person detection device 100 determines that none of the accompanying person with the user 1C exists.

The suspicious person detection device 100 records the ID of the user 1C in the user ID field and "Already-authenticated" in the authentication status field by way of the record of the user 1C in the person information database 124 (FIG. 14: (4)).

When the user 1C is authenticated by the suspicious person detection device 100, the suspicious person detection device 100 unlocks the door 40 at the entrance of the room 20 defined as the management area. The user 1C can enter the room 20 as the management area from the door 40.

Figure 17:
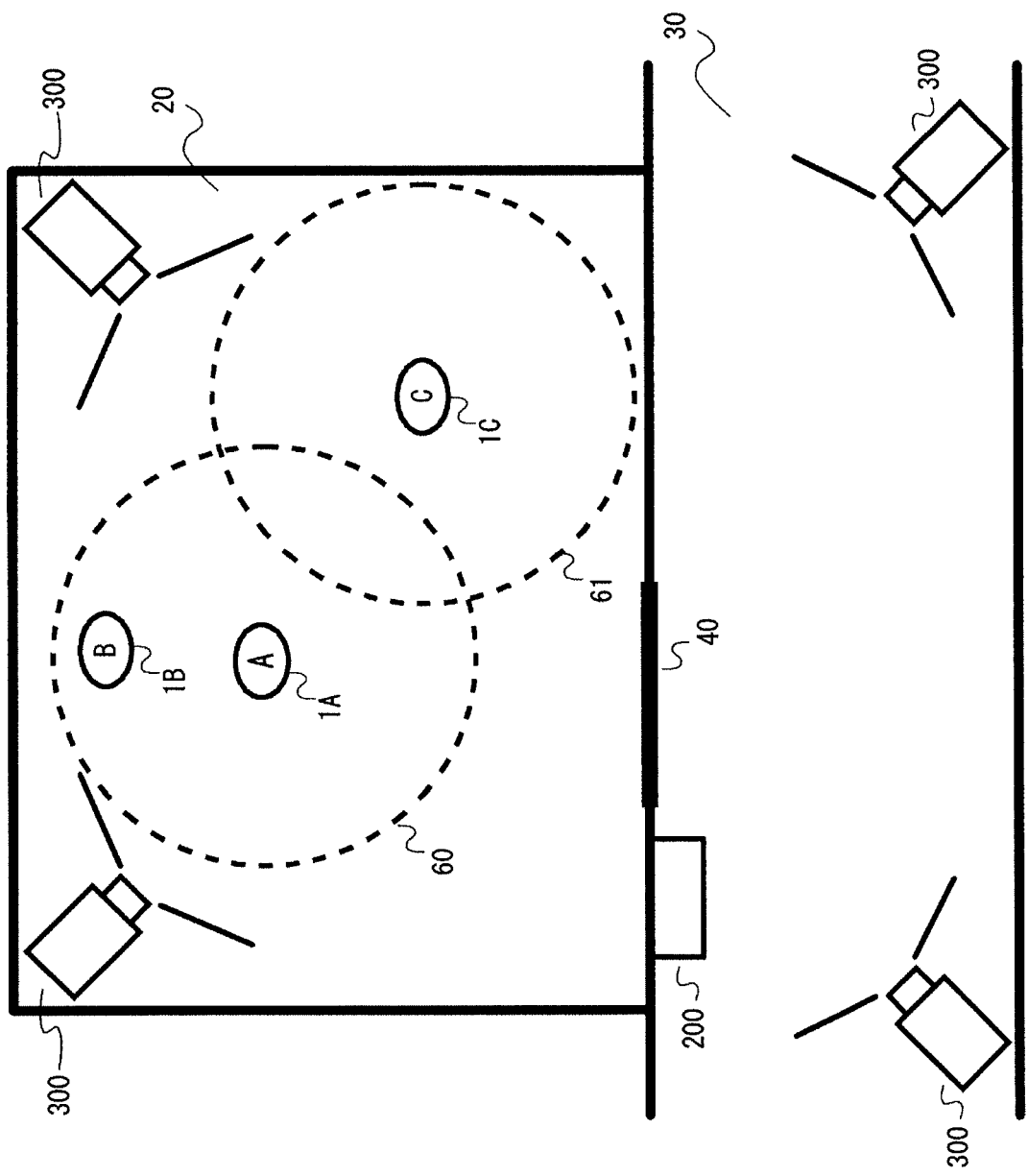
FIG. 17 is a view illustrating an example of the case where the users exist in the management area.
Figure 18:
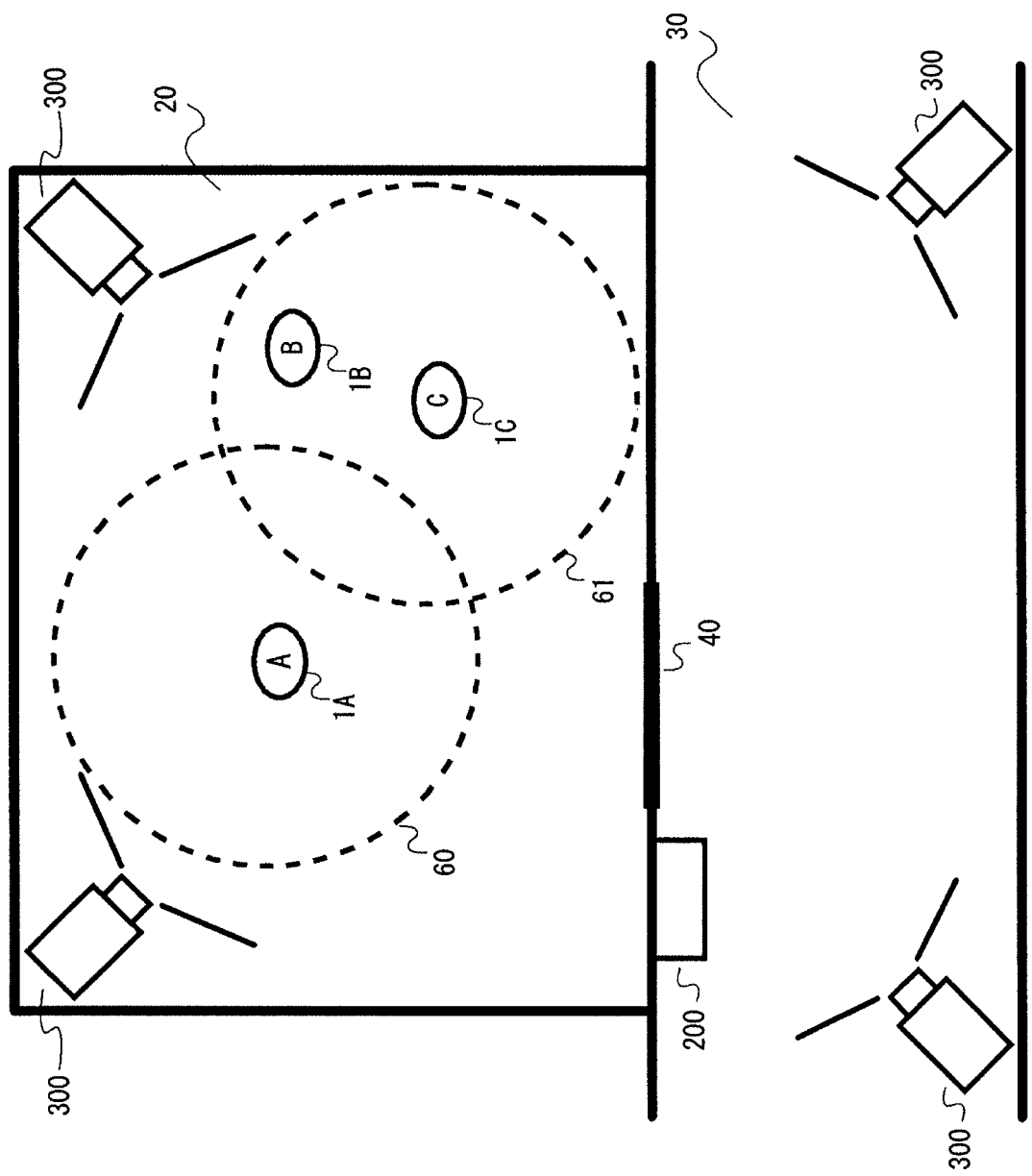
FIG. 18 is a view illustrating an example of the case where the users exist in the management area.

FIGS. 17 and 18 are views each illustrating an example in the case where the users exist in the management area.

The suspicious person detection device 100 always measures a distance between the position of the user 1A as a normal user and the position of the user 1B as the accompanying person with the user 1A.

As in FIG. 17, if the distance between the position of the user 1A and the position of the user 1B is shorter than the predetermined distance (i.e., if the user 1B exists within the range 60), the suspicious person detection device 100 does not determine that the user 1B is the suspicious person.

Further, as in FIG. 18, if the distance between the position of the user 1A and the position of the user 1C is equal to or longer than the predetermined distance, however, even if the distance between the position of the user 1C and the position of the user 1B is shorter than the predetermined distance, the suspicious person detection device 100 determines that the user 1B is the suspicious person. Namely, if the user n exists outside the range 60, but even if the user 1B exists within the range 61, the suspicious person detection device 100 determines that the user 1B is the suspicious person. This is because the user 1B is the accompanying person with the user 1A who is the already-authenticated user but is not the accompanying person with the user 1C who is also the already-authenticated user.

Modified Example

The imaging device 300 can acquire the images at the interval of 1/30 second by capturing the images over the monitoring area at the interval of 1/30 second, however, the time interval may be either longer or shorter than 1/30 second. Namely, the frame rate can be properly set within the range enabled to trace the persons preferably.

The imaging device 300 can be replaced by a device such as a laser sensor and an RFID (Radio Frequency IDentification) reader capable of detecting the positions of the persons. In this case, the person position detecting/tracking unit 102 detects and tracks the position of the person on the basis of results of measurements by the laser sensor and the RFID reader. A method of detecting the position of the person is exemplified by, e.g., as given in Non-Patent document 2, a method of measuring positions of feet of the person in a way that uses a multi-laser scanner.

The authentication device 200 may accept, from the user, the biometric information about the fingerprint, the vein, the iris, etc from which the user can be specified. In this case, the authentication information database 122 of the suspicious person detection device 100 is stored with the fingerprint information, the vein information, etc as the registered authentication information on a per user ID basis. The authentication unit 104 collates the fingerprint information and the vein information registered on the authentication information database 122 with the fingerprint information and the vein information received from the authentication device 200. The authentication unit 104, as a result of the collation, if the items of information inputted by the user to the authentication device 200 are coincident with the items of information in the authentication information database 122, authenticates the user. The authentication unit 104 uses the fingerprint information and the vein information and is thereby capable of authenticating the user with high accuracy.

The already authenticated user-to-accompanying person associating unit 108 may consider the person existing within the predetermined range determined beforehand when the already-authenticated user has been authenticated as the accompanying person with the already-authenticated user concerned. Moreover, the already authenticated user-to-accompanying person associating unit 108 extracts, after the authentication, a moving trajectory till the already-authenticated user has been authenticated, and may consider another person having the same trajectory as this moving trajectory as the accompanying person. Further, the already authenticated user-to-accompanying person associating unit 108 grasps the opening/closing state of the door 40, and may consider, as the accompanying persons with the already-authenticated user concerned, all of the not-yet-authenticated persons who passed through the door 40 till the door 40 is closed since the door has been opened due to the authentication of the already-authenticated user.

Effects in Second Embodiment

According to the second embodiment, the present positions of the already-authenticated user and of the accompanying person are detected from the images given from the imaging devices 300. The distance between the already-authenticated user and the accompanying person is measured based on the position of the already-authenticated user and the position of the accompanying person. When authenticated, the user located in the position, which is shorter than the predetermined distance from the authenticated user (already-authenticated user), is determined to be the accompanying person with the already-authenticated user. The accompanying person with the already-authenticated user exists in the position shorter than the predetermined distance from the already-authenticated user and is thereby enabled to enter the management area without authenticating the accompanying person himself or herself. The user (accompanying person) entering the management area without being authenticated is distanced at the predetermined distance or longer from the already-authenticated user and is thereby determined to be suspicious person.

According to the second embodiment, the user, who enters the management area without being authenticated, is permitted to exist only in the vicinity of the already-authenticated user in the management area. Even if the suspicious person masquerading as the accompanying person enters the management area, the alarm is issued when distanced at the predetermined distance or longer from the already-authenticated user, and it is therefore feasible to detect the suspicious person, i.e., a so-called tailgater who enters and exits together. Accordingly, the security of the management area is ensured.

Further, if the suspicious person is detected, the specification of the already-authenticated user with whom the suspicious person enters the management area is facilitated by checking which already-authenticated user this suspicious person is associated with. The administrator etc of the management area can grasp the already-authenticated user such as this, thereby restraining the already-authenticated user from accompanying the not-yet-authenticated person without permission.

Third Embodiment

A third embodiment will hereinafter be described with reference to the drawings. Next, the third embodiment will be discussed. The third embodiment has common points to the second embodiment. Accordingly, the discussion will be focused on different points, while the descriptions of the common points are omitted.

In the third embodiment, a minimum already-authenticated user-to-accompanying person distance, from which the accompanying person is considered to be the suspicious person, is dynamically determined.

Example of Architecture

Figure 19:
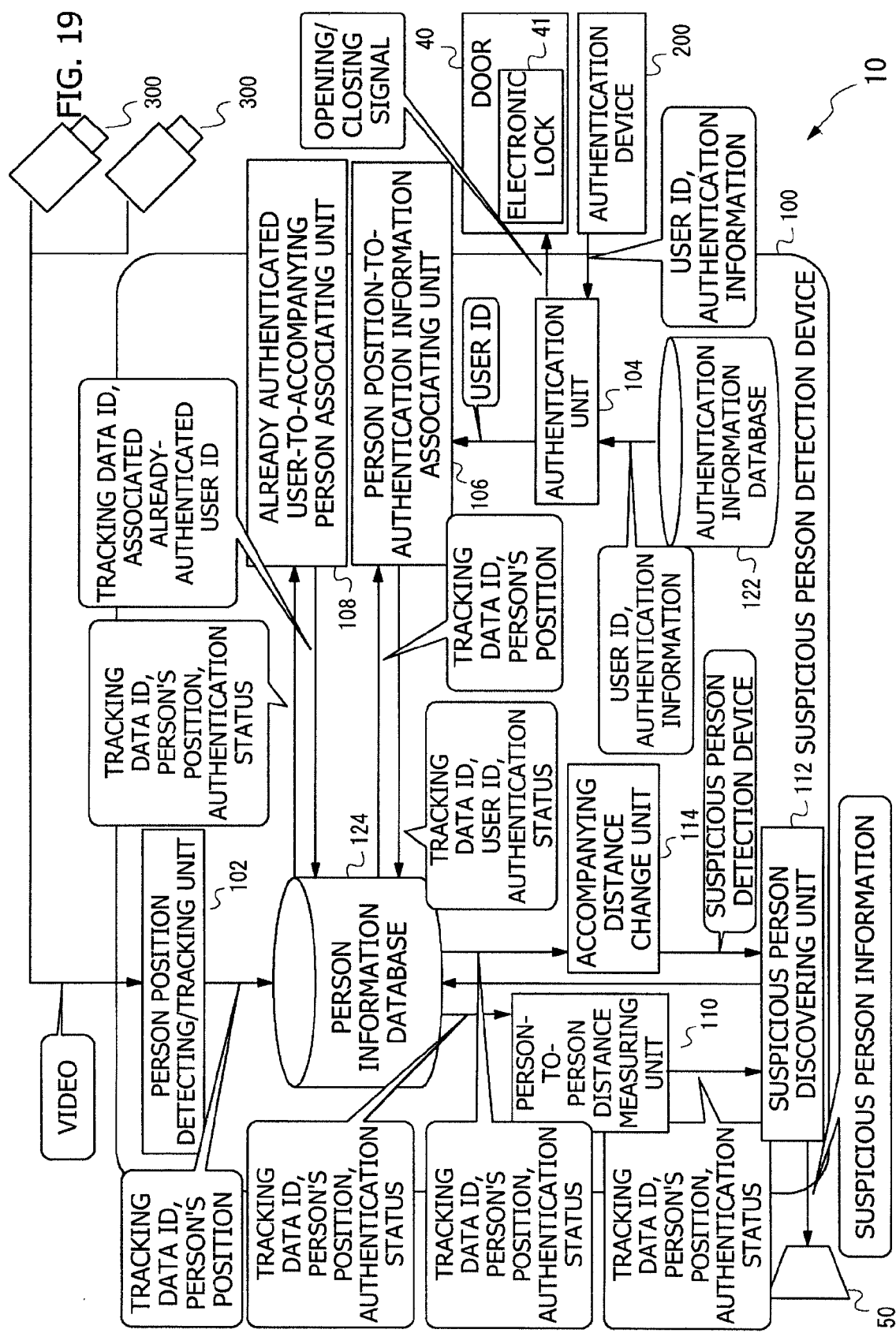
FIG. 19 is a diagram illustrating an example of the monitoring system.

FIG. 19 is a diagram depicting an example of an architecture of the monitoring system 10 in the third embodiment. The monitoring system 10 includes the suspicious person detection device 100, the authentication device 200, the imaging device 300, the door 40 and the external device 50.

The suspicious person detection device 100 includes the person position detecting/tracking unit 102, the authentication unit 104, the person position-to-authentication information associating unit 106, the already authenticated user-to-accompanying person associating unit 108, the person-toperson distance measuring unit 110 and the suspicious person discovering unit 112. Further, the suspicious person detection device 100 includes the authentication information database 122 and the person information database 124. The suspicious person detection device 100 is connected to the authentication device 200, the imaging device 300, the door 40 and the external device 50. The suspicious person detection device 100 further includes an accompanying distance change unit 114.

The accompanying distance change unit 114 determines the minimum already-authenticated user-to-accompanying person distance (accompany-enabled distance) from which the suspicious person discovering unit 112 considers the accompanying person as the suspicious person. The accompanying distance change unit 114 reads the positions of the persons from the person information database 124 and thus determines the accompany-enabled distance. The accompanying distance change unit 114 can determine the accompany-enabled distance on the basis of a velocity vector of the person. The velocity vector of the person is obtained as, e.g., a time derivative of a position vector of the person. The accompanying distance change unit 114 determines the accompany-enabled distance on a per accompanying person basis. The accompanying distance change unit 114 has an accompany-enabled distance conversion table 130. The accompany-enabled distance conversion table 130 is a table representing a relation between a difference in moving velocity between the already-authenticated user and the accompanying person, a difference in moving direction between the already-authenticated user and the accompanying person, and the accompany-enabled distance.

FIG. 20 is a diagram depicting an example of the accompany-enabled distance conversion table 130. In the example of FIG. 20, for instance, the difference in moving velocity between the already-authenticated user and the accompanying person is on the order of 2.5 km/h, and the difference in moving direction between the already-authenticated user and the accompanying person is on the order of 20 degrees, in which case the accompany-enabled distance becomes 5 m.

The accompany-enabled distance may be changed correspondingly to the number of the accompanying persons. The accompanying distance change unit 114 may set, as the accompany-enabled distance, a value obtained in a way that multiplies, e.g., the accompany-enabled distance determined based on the accompany-enabled distance conversion table 130 etc by a predetermined coefficient proportional to the number of the accompanying persons.

The suspicious person discovering unit 112 detects the suspicious person by use of the accompany-enabled distance determined by the accompanying distance change unit 114. The suspicious person discovering unit 112 determines, if the already-authenticated user-to-accompanying person distance is equal to or longer than accompany-enabled distance, the accompanying person to be the suspicious person.

The computer capable of realizing the suspicious person detection device 100 realizes a function as the accompanying distance change unit 114 in such a way that the processor loads a program stored on the secondary storage device into the main storage device and executes the program.

Operational Example

FIGS. 21 and 22 are diagrams illustrating an operation flow of the monitoring system 10 in the third embodiment. Symbols "C" and "D" in FIG. 21 connect with "C" and "D" in FIG. 22, respectively.

Step S201 through step S205 in FIG. 21 are the same as step S101 through step S105 in FIG. 6 in the second embodiment. Hence, the descriptions of step S201 through step S205 are omitted.

The accompanying distance change unit 114 of the suspicious person detection device 100 dynamically determines the minimum already-authenticated user-to-accompanying person distance (accompany-enabled distance) from which the suspicious person discovering unit 112 considers the accompanying person as the suspicious person (S206). The accompanying distance change unit 114 extracts, from the person information database 124, the information of the person about which the authentication status is "Not-yet-authenticated" and who holds the associated already-authenticated user ID. The thus-extracted person is the accompanying person with the already-authenticated user. The accompanying distance change unit 114 extracts, from the person information database 124, the information on the already-authenticated user associated with the extracted accompanying person. The accompanying distance change unit 114 obtains a present velocity vector Va of the already-authenticated user and a present velocity vector Vb of the accompanying person respectively from the extracted information on the already-authenticated user and the extracted information of the accompanying person.

The present velocity vector V can be calculated in the following manner on the basis of, e.g., a difference between a position (x1, y1) of the person at the present time (time t1) and a position (x2, y2) of the person before a predetermined period of time (time t2).

[Mathematical Expression 1]

$$\vec{V} = \left(\frac{x1-x2}{t1-t2}, \frac{y1-y2}{t1-t2}\right) \quad \text{(Equation 1)}$$

The accompanying distance change unit 114 obtains a difference D in moving velocity between the velocity vector Va and the velocity vector Vb. The difference D in moving velocity is a difference in magnitude between the velocity vector Va and the velocity vector Vb. The difference D in moving velocity is calculated as follows.

[Mathematical Expression 1]

$$D = \||\vec{Va}| - |\vec{Vb}|\| \quad \text{(Equation 2)}$$

Further, the accompanying distance change unit 114 obtains an angular difference θ in moving direction between the velocity vector Va and the velocity vector Vb. The angular difference θ in moving direction is an angle made by the velocity vector Va and the velocity vector Vb. The angular difference θ in moving direction is calculated as below. The accompanying distance change unit 114, if one of the velocity vectors is static (if the velocity vector Va or the velocity vector Vb is "0"), determines that the angular difference θ in moving direction is 0 degree.

[Mathematical Expression 3]

$$\theta = \cos^{-1}\left(\frac{\vec{Va} \cdot \vec{Vb}}{|\vec{Va}||\vec{Vb}|}\right) \quad \text{(Equation 3)}$$

The accompanying distance change unit 114 refers to the accompany-enabled distance conversion table 130 and thus determines the accompany-enabled distance on the basis of the calculated difference D in moving velocity and the calculated angular difference θ in moving direction. The accompanying distance change unit 114 determines the accompany-enabled distance on the per accompanying person basis. The accompanying distance change unit 114 transmits the items of information on the accompanying person and the already-authenticated user, which contain the tracking data ID of the accompanying person, the determined accompany-enabled distance and the user ID of the already-authenticated user to the suspicious person discovering unit 112.

The person-to-person distance measuring unit 110 measures the distance between the position of the already-authenticated user and the position of the accompanying person therewith (FIG. 22: S207). The person-to-person distance measuring unit 110 extracts, from the person information database 124, information on the person about which the authentication status is "Not-yet-authenticated" and who holds the associated already-authenticated user ID. The person-to-person distance measuring unit 110 extracts the information on the already-authenticated user associated with the extracted accompanying person from the person information database 124. The person-to-person distance measuring unit 110 measures the already-authenticated user-to-accompanying person distance. The person-to-person distance measuring unit 110 transmits, to the suspicious person discovering unit 112, the items of information on the accompanying person and the already-authenticated user, which contain the tracking data ID of the accompanying person, the present position of the accompanying person, the already-authenticated user-to-accompanying person distance and the user ID of the already-authenticated user.

The suspicious person discovering unit 112 checks whether or not the already-authenticated user-to-accompanying person distance measured by the suspicious person detection device 100 is equal to or longer than the accompany-enabled distance measured by the accompanying distance change unit 114 (S208). The suspicious person discovering unit 112 checks with respect to all of the accompanying persons whether or not the already-authenticated user-to-accompanying person distance is equal to or longer than the accompany-enabled distance.

If all of the already-authenticated user-to-accompanying person distances are not equal to or longer than the accompany-enabled distance (S208; NO), the suspicious person detection device 100 repeats the processes from step S201 onward.

If the already-authenticated user-to-accompanying person distance is equal to or longer than the accompany-enabled distance (S208; YES), the suspicious person discovering unit 112 checks whether or not the accompanying person whose already-authenticated user-to-accompanying person distance is equal to or longer than the accompany-enabled distance exists within the management area (S209). The suspicious person discovering unit 112 can check, based on whether or not the present position of this accompanying person is within the management area, whether this accompanying person exists within the management area or not.

If this accompanying person exists in the management area (S209; YES), the suspicious person discovering unit 112 determines this accompanying person to be a suspicious person. The suspicious person discovering unit 112 notifies the external device 50, the administrator, etc that this accompanying person is the suspicious person (S211). The suspicious person discovering unit 112 can notify the external device 50, the administrator, etc of the present position of this suspicious person.

If this accompanying person does not exist in the management area (S209; NO), the suspicious person discovering unit 112 records "No ID" in the associated already-authenticated user ID field in the record specified by the tracking data ID of this accompanying person in the person information database 124 (S210). This accompanying person is distanced at the predetermined distance or longer from the already-authenticated user, and hence the suspicious person discovering unit 112 determines that this accompanying person is not the accompanying person with the already-authenticated user. Furthermore, this accompanying person does not exist in the management area, and therefore the suspicious person discovering unit 112 does not give any notification saying that this accompanying person is the suspicious person.

The suspicious person discovering unit 112 executes the processes from step S209 onward with respect to all of the accompanying persons whose already-authenticated user-to-accompanying person distances are equal to or longer than the predetermined distance.

When finishing the process in step S210 or step S211, the suspicious person detection device 100 repeats the processes from step S201 onward.

Effects in Third Embodiment

According to the configuration of the third embodiment, the suspicious person detection device 100 dynamically determines the accompany-enabled distance. The suspicious person detection device 100 calculates the velocity vector of the already-authenticated user and the velocity vector of the accompanying person therewith. The suspicious person detection device 100 determines the accompany-enabled distance on the basis of the velocity vector of the already-authenticated user and the velocity vector of the accompanying person therewith. The suspicious person detection device 100 determines the accompany-enabled distance on the basis of the velocity vectors, thereby enabling the accompany-enabled distance to be elongated when the difference in moving velocity between the already-authenticated user and the accompanying person therewith is small. Further, the suspicious person detection device 100 determines the accompany-enabled distance on the basis of the velocity vectors, thereby enabling the accompany-enabled distance to be elongated when the angular difference in moving direction between the already-authenticated user and the accompanying person therewith is small. For example, the suspicious person detection device 100, when the difference in moving velocity between the already-authenticated user and the accompanying person therewith is large, can easily detect the suspicious person by shortening the accompany-enabled distance.

According to the third embodiment, the suspicious person detection device 100 determines the accompany-enabled distance on the basis of the velocity vectors, whereby the accompany-enabled distance can be properly determined based on the difference in moving velocity and the angular difference in moving direction between the already-authenticated user and the accompanying person therewith. The suspicious person, who masquerades as the accompanying person, does not behave together with the already-authenticated user and is therefore considered different in moving velocity and moving direction from the already-authenticated user. The suspicious person detection device 100, if the difference in moving velocity and the angular difference in moving direction are large, can easily detect the suspicious person masquerading as the accompanying person by shortening the accompany-enabled distance.

Fourth Embodiment

A fourth embodiment will hereinafter be described. The fourth embodiment has common points to the second and third embodiments. Accordingly, the discussion will be focused on different points, while the descriptions of the common points are omitted.

In the fourth embodiment, the accompany-enabled distance is determined corresponding to a degree of secrecy (confidentiality) of the room.

Example of Architecture

FIG. 23 is a diagram depicting an example of an architecture of the monitoring system 10 in the fourth embodiment. The monitoring system 10 includes the suspicious person detection device 100, the authentication device 200, the imaging device 300, the door 40 and the external device 50.

The suspicious person detection device 100 includes the person position detecting/tracking unit 102, the authentication unit 104, the person position-to-authentication information associating unit 106, the already authenticated user-to-accompanying person associating unit 108, the person-to-person distance measuring unit 110, the suspicious person discovering unit 112 and the accompanying distance change unit 114. Further, the suspicious person detection device 100 includes the authentication information database 122, the person information database 124 and a room information database. The suspicious person detection device 100 is connected to the authentication device 200, the imaging device 300, the door 40 and the external device 50.

The accompanying distance change unit 114 determines the accompany-enabled distance on the basis of the degree of secrecy of the room. The accompanying distance change unit 114 checks which room the already-authenticated user exists from the present position of the already-authenticated user in the person information database 124 and from the information in a room information database 126. The accompanying distance change unit 114 refers to the room information database 126 and thus determines the accompany-enabled distance, corresponding to the position (room) where the already-authenticated user exists.

FIG. 24 is a diagram illustrating an example of the room information database 126. The room information database 126 is stored with respective records each containing a room name field, a position field, a dimensions field, a degree-of-secrecy field, a accompany-enabled distance field, etc. An area of each room is specified by the position and the dimensions. The area of each room may also be specified otherwise. The degree of secrecy is information which represents a degree of importance of the room. The higher degree of secrecy of the room represents the more importance room, in which the accompany-enabled distance becomes shorter.

As the degree of secrecy becomes higher, the accompany-enabled distance is set shorter in order to prevent the information more strictly from being leaked out etc. Further, the degree of secrecy becomes lower, the accompany-enabled distance may be set longer so as to permit the workers to move freely. Moreover, the degree of secrecy is herein set on a room-by-room basis, however, the degree of secrecy may be changed depending on the area even within the same room. For example, a server with high confidentiality is installed in a certain area in the room, and the accompany-enabled distance may be set so that the already-authenticated user must exist nearby in order for the accompanying person to approach this area.

Operational Example

An operation flow of the monitoring system 10 in the fourth embodiment is the same as the operation flow in FIGS. 21 and 22 in the third embodiment. A difference is, however, the way of how the accompanying distance change unit 114 of the suspicious person detection device 100 obtains the accompany-enabled distance. This different point will be described.

The accompanying distance change unit 114 of the suspicious person detection device 100 determines the accompany-enabled distance on the basis of the degree of secrecy of the room. The accompanying distance change unit 114 extracts the information on the person about which the authentication status is "Not-yet-authenticated" and who holds the associated already-authenticated user ID from the person information database 124. The extracted person is the accompanying person with the already-authenticated user. The accompanying distance change unit 114 extracts the information on the already-authenticated user associated with the extracted accompanying person from person information database 124. The accompanying distance change unit 114 checks the present position of the already-authenticated user from the extracted information on the already-authenticated user. The accompanying distance change unit 114 extracts, based on a present position of an already-authenticated assistant, the information on the room where the already-authenticated assistant exists at the present from the room information database 126. The accompanying distance change unit 114 sets the accompany-enabled distance of the room where the already-authenticated assistant exists at the present as an accompany-enabled distance of an accompanying person with the already-authenticated assistant. The accompanying distance change unit 114 similarly determines the accompany-enabled distances of all of the accompanying persons.

In the example of FIG. 24, for instance, if the already-authenticated assistant exists in a meeting room, the accompany-enabled distance of the accompanying person with this already-authenticated assistant becomes 5 m.

Effects in Fourth Embodiment

According to the configuration of the fourth embodiment, the suspicious person detection device 100 changes the accompany-enabled distance of the accompanying person on the basis of the degree of secrecy of the room in which the already-authenticated assistant exists. According to the configuration of the fourth embodiment, the accompany-enabled distance is changed based on the degree of secrecy of the room, thereby enabling the accompany-enabled distance to be shortened with respect to the important room and enabling the security of the important room to be ensured.

Fifth Embodiment

Next, a fifth embodiment will hereinafter be described. The fifth embodiment has common points to the second and third embodiments. Accordingly, the discussion will be focused on different points, while the descriptions of the common points are omitted.

The fifth embodiment, unlike the second embodiment etc, does not involve using the authentication device, the authentication information database, etc. In the fifth embodiment, the user, who opens the door in the management area by a key or the like, is determined to be an authenticated person.

Example of Architecture

Figure 25:
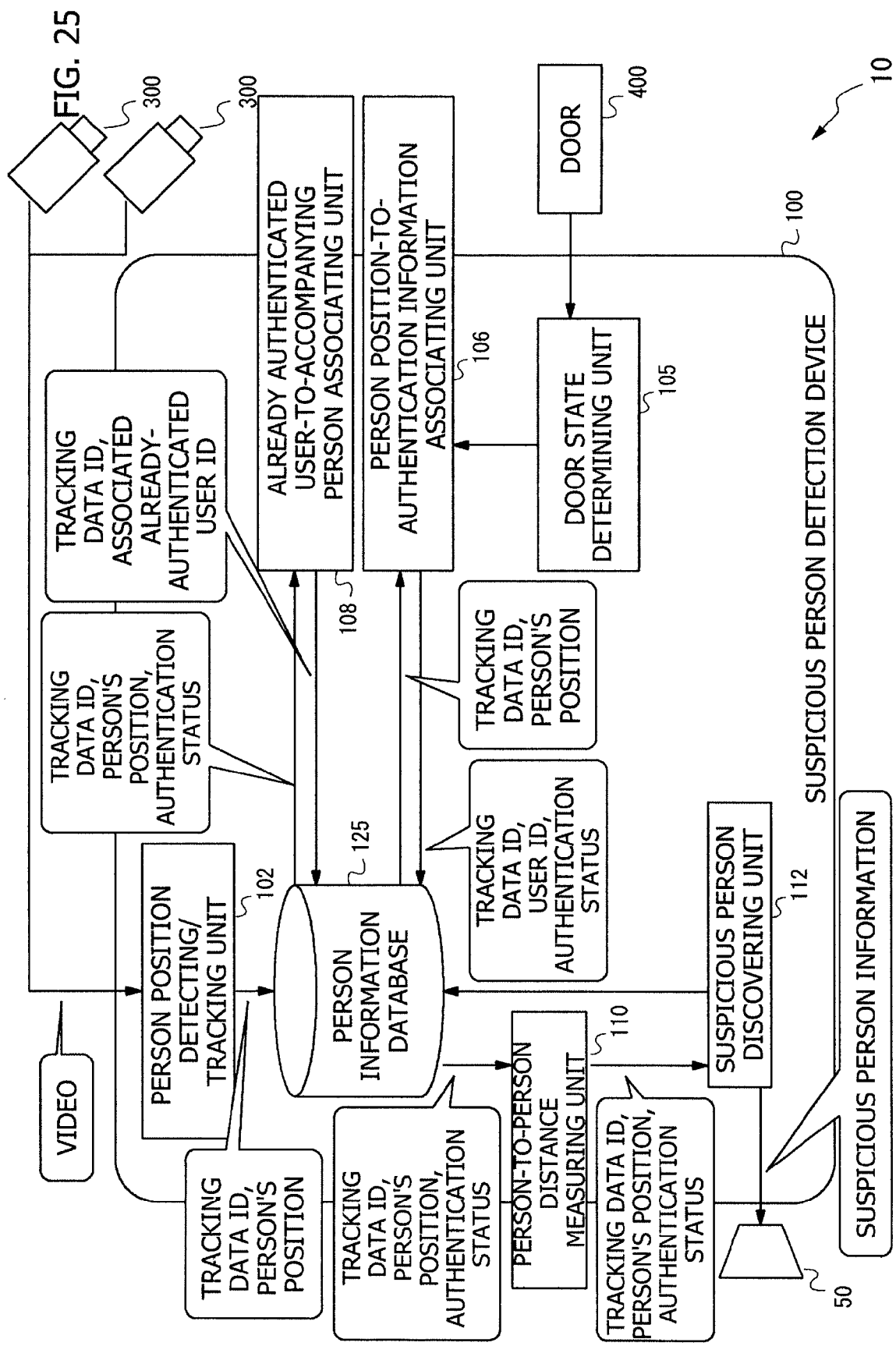
FIG. 25 is a diagram illustrating an example of the monitoring system.

FIG. 25 is a diagram depicting an example of an architecture of the monitoring system 10 in the fifth embodiment. The monitoring system 10 includes the suspicious person detection device 100, the imaging device 300, a door 400 and the external device 50.

The suspicious person detection device 100 includes a door state determining unit 105, the person position-to-authentication information associating unit 106, the already authenticated user-to-accompanying person associating unit 108, the person-to-person distance measuring unit 110 and the suspicious person discovering unit 112. Further, the suspicious person detection device 100 includes the person information database 124. The suspicious person detection device 100 is connected to the imaging device 300, the door 400 and the external device 50.

FIG. 26 is a diagram illustrating an example of a person information database 125. The person information database 125 is stored with the information on the persons existing in the monitoring area. The person information database 125 is stored with respective records each containing the tracking data ID field for managing the tracking data on the person-by-person basis, the authentication status field, an associated tracking data ID field, the present person's position field, the moving trajectory field (past positions), etc. The authentication status is the information indicating whether the user is the already-authenticated person or the not-yet-authenticated person. The associated tracking data ID is information that specifies which already-authenticated user accompanies the accompanying person.

The door state determining unit 105 determines an unlocking state of the door 400. The door state determining unit 105, when the door 400 is unlocked, notifies the person position-to-authentication information associating unit 106 that the door 400 has been unlocked. The door state determining unit 105 can determine the unlocking state of the door by utilizing, e.g., an electronic lock as the lock and checking an on-state to electrify the electronic lock.

The door 400 is a door installed at the entrance of the management area. The door 400 is unlocked by a key held by the user.

The person position-to-authentication information associating unit 106 associates the already-authenticated user with a person existing in the nearest position to the door when door opens.

The processor loads the program stored on the secondary storage device into the main storage device and executes the program, whereby the computer capable of realizing the suspicious person detection device 100 realizes a function as the door state determining unit 105. On the other hand, the person information database 125 is provided in the storage area of the main storage device or the secondary storage device.

Operational Example

Figure 27:
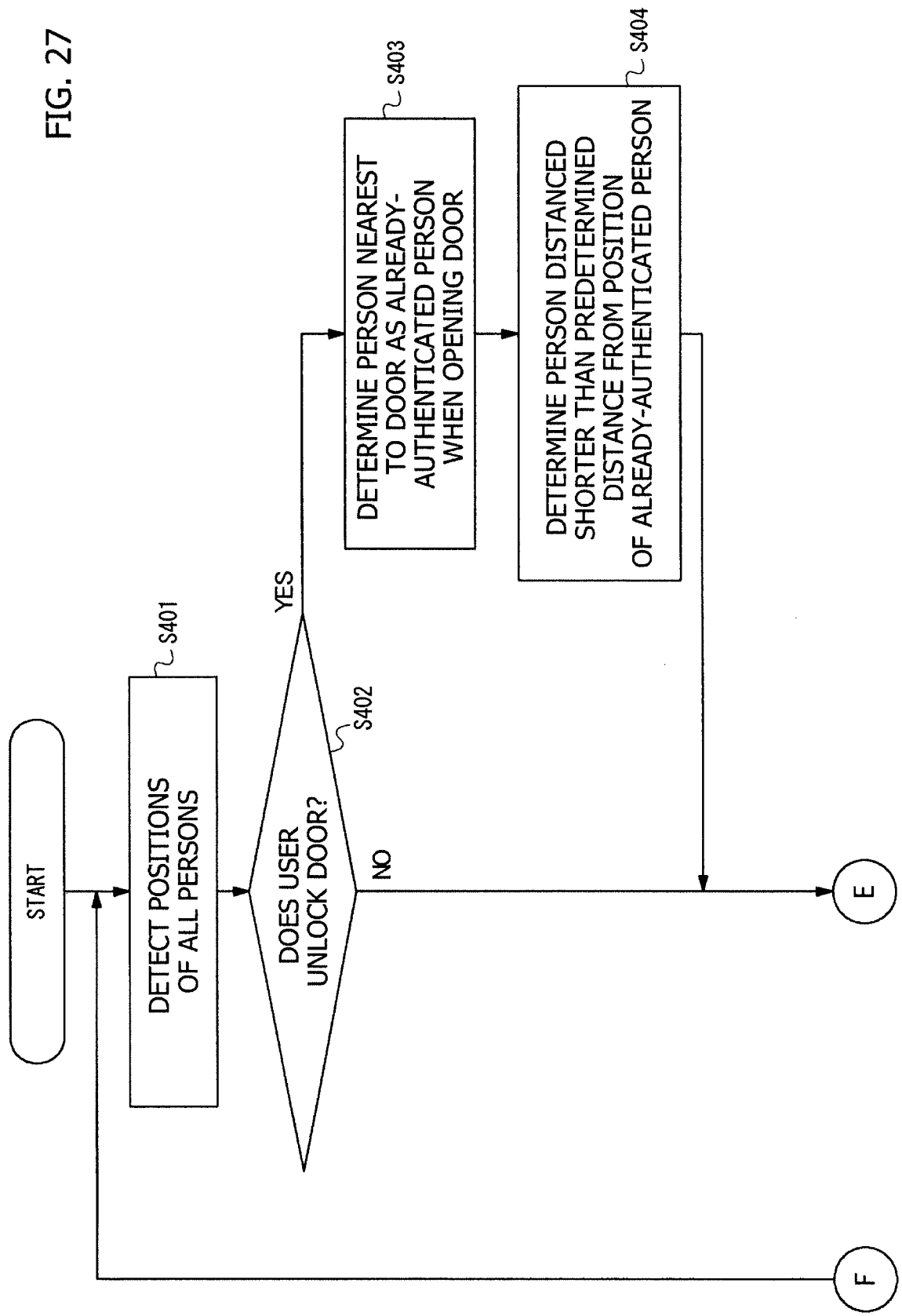
FIG. 27 is a flowchart illustrating an example (1) of an operation flow of the monitoring system.

FIGS. 27 and 28 are flowcharts illustrating an example of an operation flow of the monitoring system 10 in the fifth embodiment. Symbols "E" and "F" in FIG. 27 connect with "E" and "F" in FIG. 28, respectively.

Upon the startup of the monitoring system 10, the imaging device 300 captures the images over the monitoring area and transmits the captured images to the person position detecting/tracking unit 102 of the suspicious person detection device 100.

The person position detecting/tracking unit 102 receives the images from the imaging device 300. The person position detecting/tracking unit 102 detects the positions of all of the persons existing in the monitoring area from the received images (FIG. 27: S401). The person position detecting/tracking unit 102 continuously tracks the persons existing in the monitoring area.

The door state determining unit 105 checks whether the door is unlocked or not (S402). If the door is unlocked (S402; YES), the door state determining unit 105 notifies the person position-to-authentication information associating unit 106 that the door has been unlocked.

The person position-to-authentication information associating unit 106 extracts, from the person information database 125, the tracking data ID of the person about which the authentication status is "Not-yet-authenticated" and who has the shortest distance in position from the person existing in the position of the door 400. The person position-to-authentication information associating unit 106 previously holds the information on the position of the door 400. The person position-to-authentication information associating unit 106 considers the person having this extracted tracking data ID to be the already-authenticated user (S403). Moreover, the person position-to-authentication information associating unit 106 records "Already-authenticated" in the authentication status field of the record specified by the extracted tracking data ID in the person information database 125.

In the example of FIG. 26, "Already-authenticated" is recorded in the authentication status field of the record specified by "001" given in the tracking data ID field in the person information database 125. Further, in the example of FIG. 26, "Already-authenticated" is recorded in the authentication status field of the record specified by "003" given in the tracking data ID field in the person information database 125. These items of information represent that the persons specified by "001" and "003" given in their tracking data ID fields are the already-authenticated users who open the door 400, respectively.

The already authenticated user-to-accompanying person associating unit 108 extracts, from the person information database 125, the tracking data ID of the person about which the authentication status is "Not-yet-authenticated" and who is distanced at the predetermined distance or shorter from the position of the already-authenticated user authenticated in step S403. The already authenticated user-to-accompanying person associating unit 108 considers the person specified by this extracted tracking data ID is the accompanying person (the accompanying person with the already-authenticated user) with the person considered to be the already-authenticated user in step S403. Further, the already authenticated user-to-accompanying person associating unit 108 may consider, as the accompanying person, the person existing within a predetermined range proximal to the door 400 when the already-authenticated user unlocks the door 400. The already authenticated user-to-accompanying person associating unit 108 records the tracking data ID of this already-authenticated user by way of the associated already-authenticated user ID in the record specified by the extracted tracking data ID in the person information database 125 (S404). Further, if there is no person distanced shorter than the predetermined distance from the position of the already-authenticated user, the already authenticated user-to-accompanying person associating unit 108 does not recognize (authenticate) the accompanying person but advances to step S405.

In the example of FIG. 26, "001" is recorded in the associated tracking data ID field of the record specified by "002" given in the tracking data ID field in the person information database 125. This represents that the person specified by "002" given in the tracking data ID field is the accompanying person with the person (already-authenticated user) specified by "001" given in the tracking data ID.

Whereas if the door is not unlocked (S402; NO) and after the process (S404) by the already authenticated user-to-accompanying person associating unit 108, the person-to-person distance measuring unit 110 measures a distance between the position of the already-authenticated user and the position of the accompanying person (FIG. 28: S405).

The processes from step S405 onward are the same as the processes from step S106 in FIG. 7 in the second embodiment. Hence, the descriptions of the processes from step S405 onward are omitted.

Modified Example

The door state determining unit 105 may determine the opening/closing state of the door from the image captured by the imaging device 300. The door state determining unit 105 previously saves the image of the door in the closed state, then compares the image of the door at the present with the saved image of the door, and can, if different, determine that the door is opened.

Effects in Fifth Embodiment

According to the fifth embodiment, the user, who opens the door by using the key etc, is considered to be the already-authenticated user, and another person existing nearby is considered to be the accompanying person therewith, thereby enabling the accompanying person to enter the management area without using the key.

According to the fifth embodiment, even if an invalid intruder (suspicious person) (masquerading) as the accompanying person enters the management area, the alarm is issued when distanced at the predetermined distance or longer from the already-authenticated user.

What is claimed is:

1. A suspicious person detection device comprising:
 a person detection unit to be capable of detecting a position of a person on a per person basis;
 a person tracking unit to continuously trace the person's position detected by said person detection unit; and
 a suspicious person detection unit to detect a suspicious person on the basis of a tracking result of said person tracking unit,
 wherein said person tracking unit determines, as an already-authenticated person, a person authenticated when coinciding with a predetermined first condition, and determines, as an accompanying person, a person who coincides with a predetermined second condition related to the already-authenticated person when authenticated,
 said suspicious person detection unit, when the accompanying person is distanced at a predetermined first distance or longer from the already-authenticated person, issues an alarm, and
 the predetermined first distance is set based on a difference in velocity vector between the accompanying person and the already-authenticated person, the difference in the velocity vector being defined by a difference in moving velocity and an angular difference in moving direction.

2. A suspicious person detection device according to claim 1, wherein the predetermined second condition is that the distance from the already-authenticated person when authenticated is shorter than a predetermined second distance.

3. A suspicious person detection device according to claim 1, wherein the predetermined first distance is set corresponding to a degree of secrecy of an area where the person is located.

4. A suspicious person detection device according to claim 1, wherein the already-authenticated person opens a door after being authenticated, in which case the predetermined second condition is that the accompanying person is a person who passes through the door till the door is closed since the door has been opened.

5. A suspicious person detection device according to claim 1, wherein the predetermined first condition is that a person, who unlocks a predetermined door, is determined to be the already-authenticated person.

6. A suspicious person detection method by which a computer executes:
 detecting a position of a person on a per person basis; and
 tracking continuously the detected position of the person; and
 wherein a person authenticated by coinciding with the predetermined first condition is determined to be an already-authenticated person, while a person, who coincides with a predetermined second condition related to the already-authenticated person when authenticated is determined to be an accompanying person, and
 an alarm is issued when the accompanying person is distanced at a predetermined first distance or longer from the already-authenticated person, and
 the predetermined first distance is set based on a difference in velocity vector between the accompanying person and the already-authenticated person, the difference in the velocity vector being defined by a difference in moving velocity and an angular difference in moving direction.

7. A suspicious person detection method according to claim 6, wherein the predetermined second condition is that the distance from the already-authenticated person when authenticated is shorter than a predetermined second distance.

8. A suspicious person detection method according to claim 6, wherein the predetermined first distance is set corresponding to a degree of secrecy of an area where the person is located.

9. A suspicious person detection method according to claim 6, wherein the already-authenticated person opens a door after being authenticated, in which case the predetermined second condition is that the accompanying person is a person who passes through the door till the door is closed since the door has been opened.

10. A suspicious person detection method according to claim 6, wherein the predetermined first condition is that a person, who unlocks a predetermined door, is determined to be the already-authenticated person.

11. A non-transitory computer readable storage medium storing a suspicious person detection program to be executed by a computer, the program executing:
 detecting a position of a person on a per person basis; and
 tracking continuously the detected position of the person; and
 wherein a person authenticated by coinciding with the predetermined first condition is determined to be an already-authenticated person, while a person, who coincides with a predetermined second condition related to the already-authenticated person when authenticated is determined to be an accompanying person, an alarm is issued when the accompanying person is distanced at a predetermined first distance or longer from the already-authenticated person, and the predetermined first distance is set based on a difference in velocity vector between the accompanying person and the already-authenticated person, the difference in the velocity vector being defined by a difference in moving velocity and an angular difference in moving direction.

* * * * *

UNITED STATES PATENT AND TRADEMARK OFFICE
CERTIFICATE OF CORRECTION

| | | |
|---|---|---|
| PATENT NO. | : 8,786,699 B2 | Page 1 of 1 |
| APPLICATION NO. | : 13/315770 | |
| DATED | : July 22, 2014 | |
| INVENTOR(S) | : Kentaro Tsuji et al. | |

It is certified that error appears in the above-identified patent and that said Letters Patent is hereby corrected as shown below:

In the Claims

Column 28, Line 30, In Claim 6, after "person," delete "and".

Signed and Sealed this
Fourth Day of November, 2014

Michelle K. Lee
*Deputy Director of the United States Patent and Trademark Office*